US008170820B2

(12) United States Patent  (10) Patent No.: US 8,170,820 B2
Pupalaikis et al.  (45) Date of Patent: *May 1, 2012

(54) VIRTUAL PROBING

(75) Inventors: Peter J. Pupalaikis, Ramsey, NJ (US); Lawrence W. Jacobs, Beaverton, OR (US); Stephen M. Sekel, Camas, WA (US)

(73) Assignee: LeCroy Corporation, Chestnut Ridge, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/641,652

(22) Filed: Dec. 18, 2009

(65) Prior Publication Data

US 2010/0121595 A1    May 13, 2010

Related U.S. Application Data

(63) Continuation of application No. 11/888,547, filed on Aug. 1, 2007, now Pat. No. 7,660,685.

(60) Provisional application No. 60/835,029, filed on Aug. 2, 2006, provisional application No. 60/861,678, filed on Nov. 29, 2006.

(51) Int. Cl.
    *G06F 19/00* (2011.01)
(52) U.S. Cl. ......... 702/66; 702/106; 702/121; 324/72.5; 324/754; 324/158.1; 455/296; 375/346
(58) Field of Classification Search .............. 702/66, 702/106, 121; 324/72.5, 149, 690, 754, 715, 324/724, 158.1; 455/296, 319, 323, 333, 455/118; 375/147, 316, 317, 346, 345
See application file for complete search history.

(56) References Cited

U.S. PATENT DOCUMENTS

| | | | |
|---|---|---|---|
| 5,579,299 A | 11/1996 | Halter et al. | |
| 5,691,635 A | 11/1997 | Pot et al. | |
| 6,351,112 B1 * | 2/2002 | Felps et al. | 324/72.5 |
| 6,701,335 B2 | 3/2004 | Pupalaikis | |
| 6,725,170 B1 | 4/2004 | Hickman | |
| 6,856,126 B2 * | 2/2005 | McTigue et al. | 324/72.5 |
| 6,870,359 B1 | 3/2005 | Sekel | |
| 7,180,314 B1 | 2/2007 | Sekel | |
| 7,233,967 B2 | 6/2007 | Sureka | |
| 7,405,575 B2 * | 7/2008 | Tan et al. | 324/638 |
| 7,408,363 B2 * | 8/2008 | Tan et al. | 324/638 |
| 7,414,411 B2 * | 8/2008 | Tan et al. | 324/601 |

(Continued)

OTHER PUBLICATIONS

Bockelman, D.E. et al., "Combined Differential and Common-mode Scattering Parameters: Theory and Simulation", *IEEE Trans. Microwave Theory Tech.*, vol. 43, (Jul. 1995),1530-1539.

(Continued)

*Primary Examiner* — Carol Tsai
(74) *Attorney, Agent, or Firm* — Gordon Kessler

(57) ABSTRACT

A method and apparatus for generating one or more transfer functions for converting waveforms. The method comprises the steps of determining a system description, representative of a circuit, comprising a plurality of system components, each system component comprising at least one component characteristic, the system description further comprising at least one measurement node and at least one output node, each of the at least one measurement nodes representative of a waveform digitizing location in the circuit. One or more transfer functions are determined for converting a waveform from one or more of the at least one measurement nodes to a waveform at one or more of the at least one output nodes. The generated transfer functions are then stored in a computer readable medium.

44 Claims, 18 Drawing Sheets

Typical Single-Ended Measurement Configuration

U.S. PATENT DOCUMENTS

| | | | |
|---|---|---|---|
| 7,460,983 B2 * | 12/2008 | Pickerd et al. | 702/190 |
| 2004/0223349 A1 * | 11/2004 | Nash | 363/39 |
| 2005/0185768 A1 * | 8/2005 | Pickerd et al. | 379/30 |
| 2005/0185769 A1 * | 8/2005 | Pickerd et al. | 379/30 |
| 2005/0265725 A1 | 12/2005 | Okano et al. | |
| 2006/0098987 A1 | 5/2006 | Hoshida | |
| 2007/0189176 A1 | 8/2007 | Milne et al. | |
| 2007/0220357 A1 | 9/2007 | Vedanabhatla et al. | |
| 2008/0048673 A1 * | 2/2008 | Tan et al. | 324/601 |
| 2008/0048677 A1 * | 2/2008 | Tan et al. | 324/638 |
| 2008/0052028 A1 * | 2/2008 | Pickerd et al. | 702/109 |

OTHER PUBLICATIONS

Kurokawa, K "Power Waves and the Scattering Matrix", *IEEE Trans. Microwave Theory Tech.*, vol. MTT-13, (Mar. 1965), 194-202.

"S-Parameter Design", *Agilent Application Note 154 (5852-1087)*. (Mar. 1990), 1-44.

Smolyansky, D.A. et al., "Characterization of differential interconnects from time domain reflectometry measurements", *TDA Systems Inc. Published in Microwave Journal*. vol. 43, No. 3, (2000), 1-6.

McGowan, R et al., "A direct relation between signal time series and its unwrapped phase", *IEEE Trans. Acoust., Speech, Signal Processing*, vol. ASSP-30, (1982),719-726.

Long, D.G. "Exact computation of the unwrapped phase of a finite-length time series", *IEEE Trans. Acoust., Speech, Signal Processing*, vol. 36, No. 11, (Nov. 1988),1787-1790.

"Three and four port s-parameters: calibrations and mixed mode parameters", *Anritsu Application Note*, 11410-00279, (Nov. 2001),1-16.

"WaveLink probe system", *LeCroy Corporation*, (Sep. 2005),1-8.

"Restoring Confidence in Your High-Bandwidth Probe Measurements", *Agilent Application Note 1419-01*, (Nov. 2002),1-6.

"Improving Usability and Performance in High-Bandwidth Active Oscilloscope Probes", *Agilent Application Note 1419-02*, (Nov. 2002),1-12.

"Performance Comparison of Differential and Single-Ended Active Voltage Probes", *Agilent Application Note 1419-03*, (Nov. 2002),1-12.

"Network Communication Physical Layer Testing with a CSA7000 Series Communications Signal Analyzer", *Tektronix Application Note 55W-15028-0*, (2001),1-12.

"S-Parameter Techniques for Faster, More Accurate Network Design", *Hewlett Packard Test & Measurement Application Note 95-1*, (1996),1-79.

Fan, W et al., "Mixed-Mode S-Parameter Characterization of Differential Structures", *IEEE 2003 Electronics Packaging Technology Conference*, (2003),533-537.

Pupalaikis, Peter J., "Probe Compensation, Signal Flow Diagrams, Channel Emulation, Etc.", (Sep. 15, 2006),1-43.

\* cited by examiner

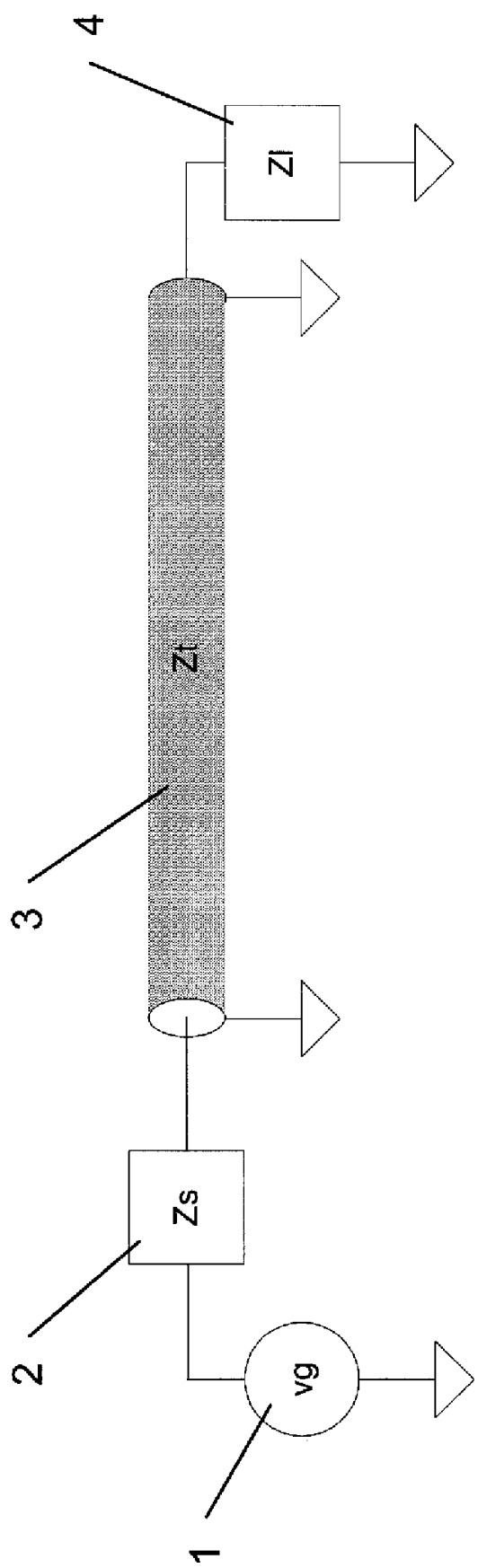
Figure 1 – Typical Single-Ended Circuit to be Measured.

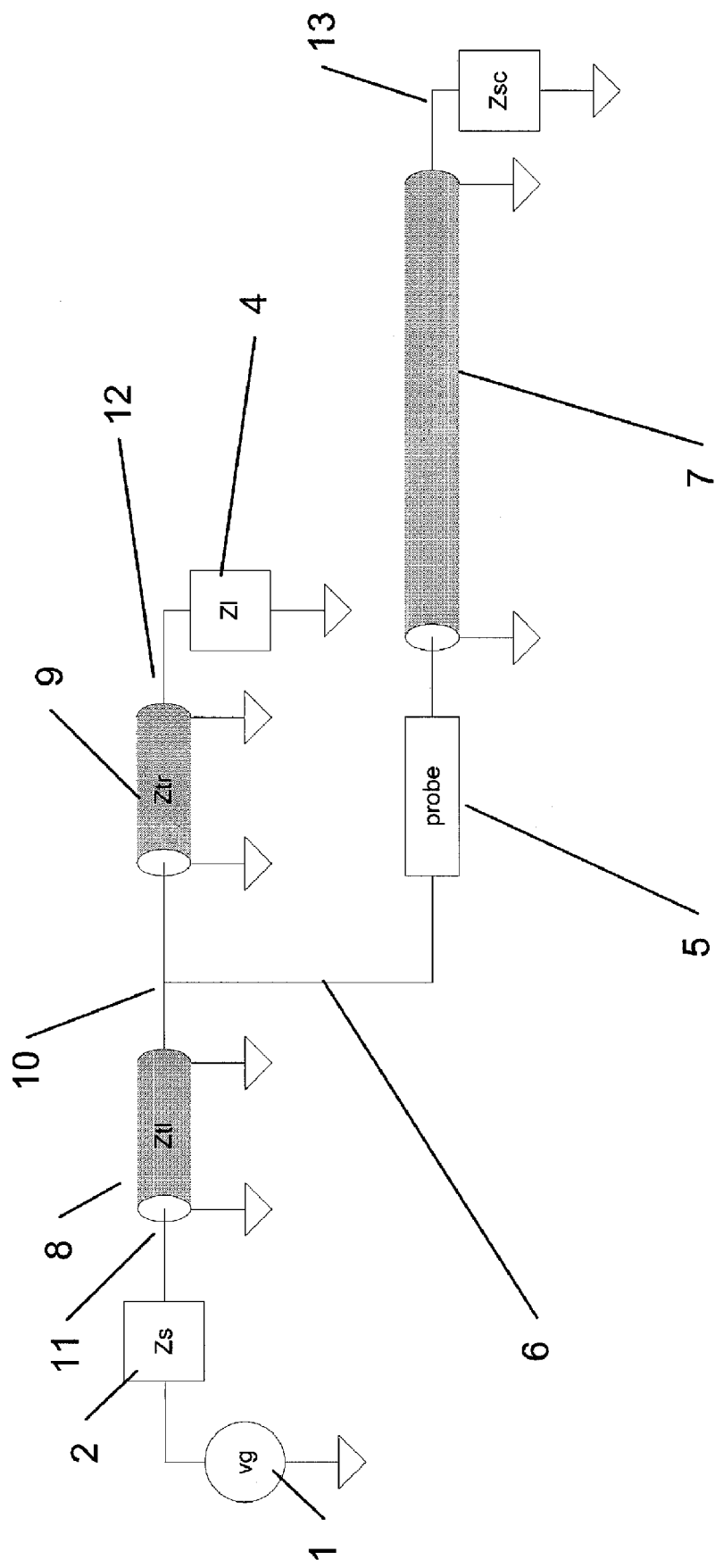
Figure 2 – Typical Single-Ended Measurement Configuration

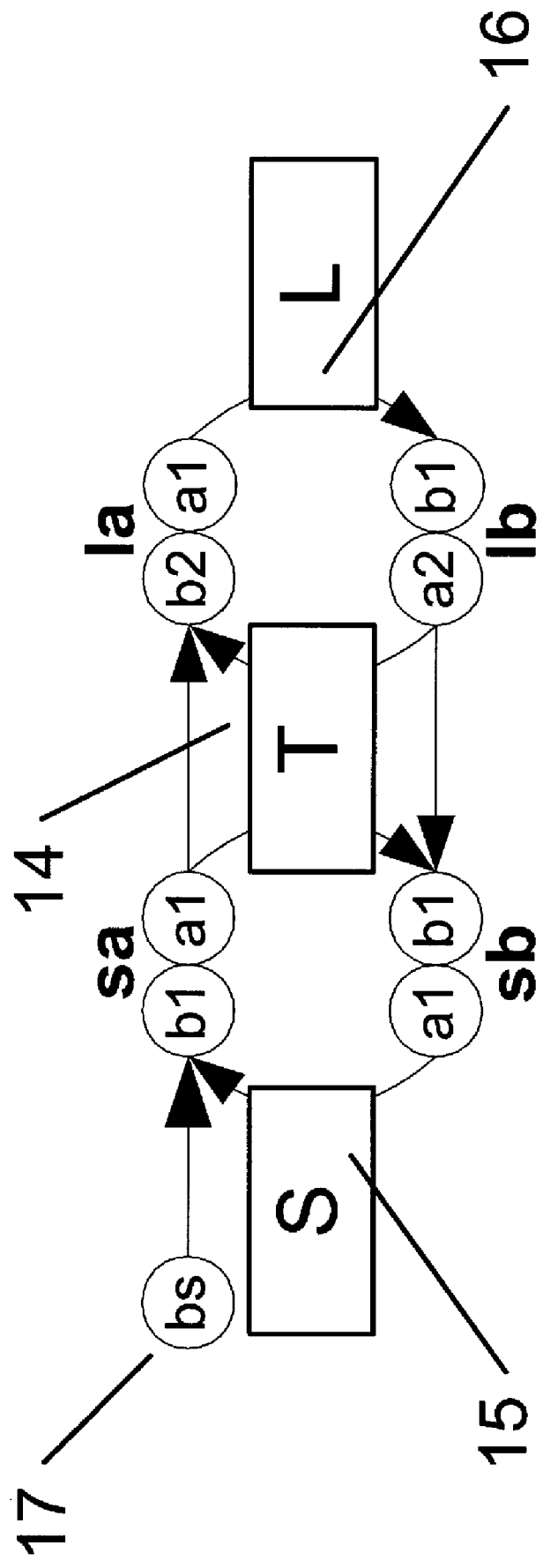
Figure 3 – Signal Flow Diagram of Typical Single-Ended Circuit to be Measured

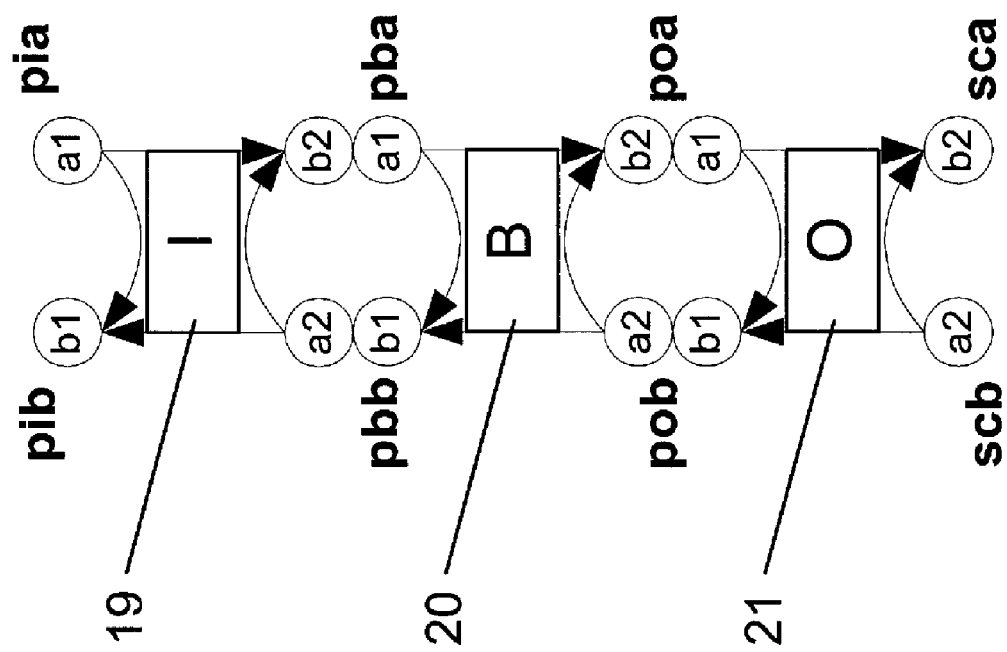
Figure 4 – Signal Flow Diagram of Single-Ended Prob

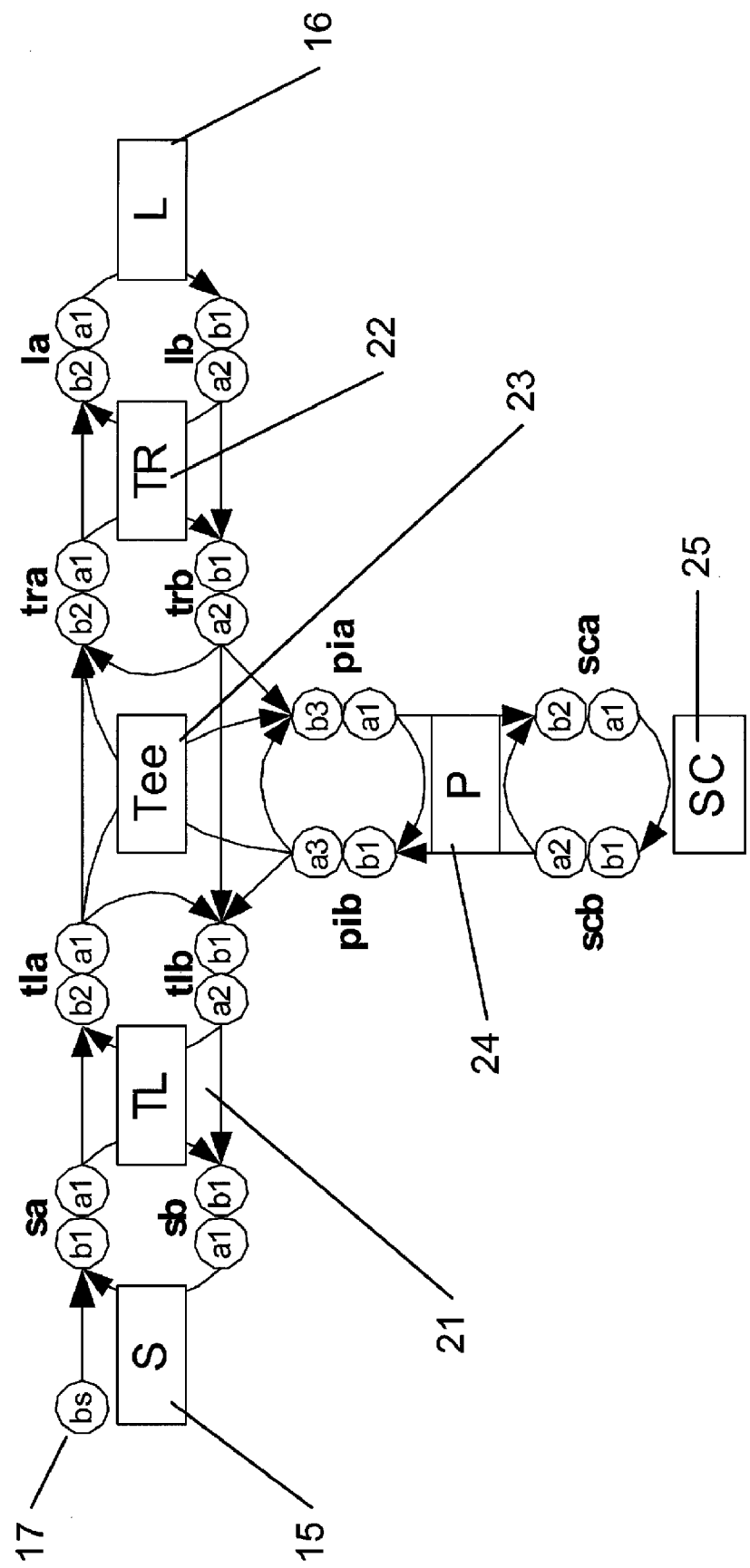
Figure 5 – Signal Flow Diagram of Typical Single-Ended Measurement Configuration

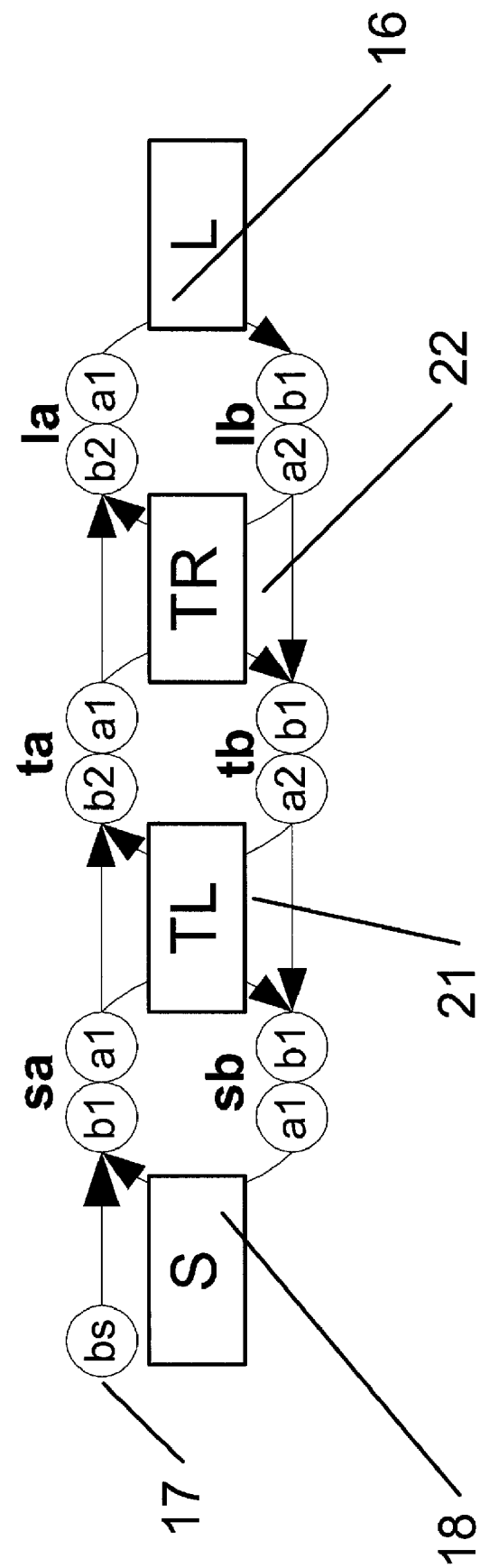
Figure 6 – Signal Flow Diagram of Single-Ended Circuit to be Measured Without Probe Connected

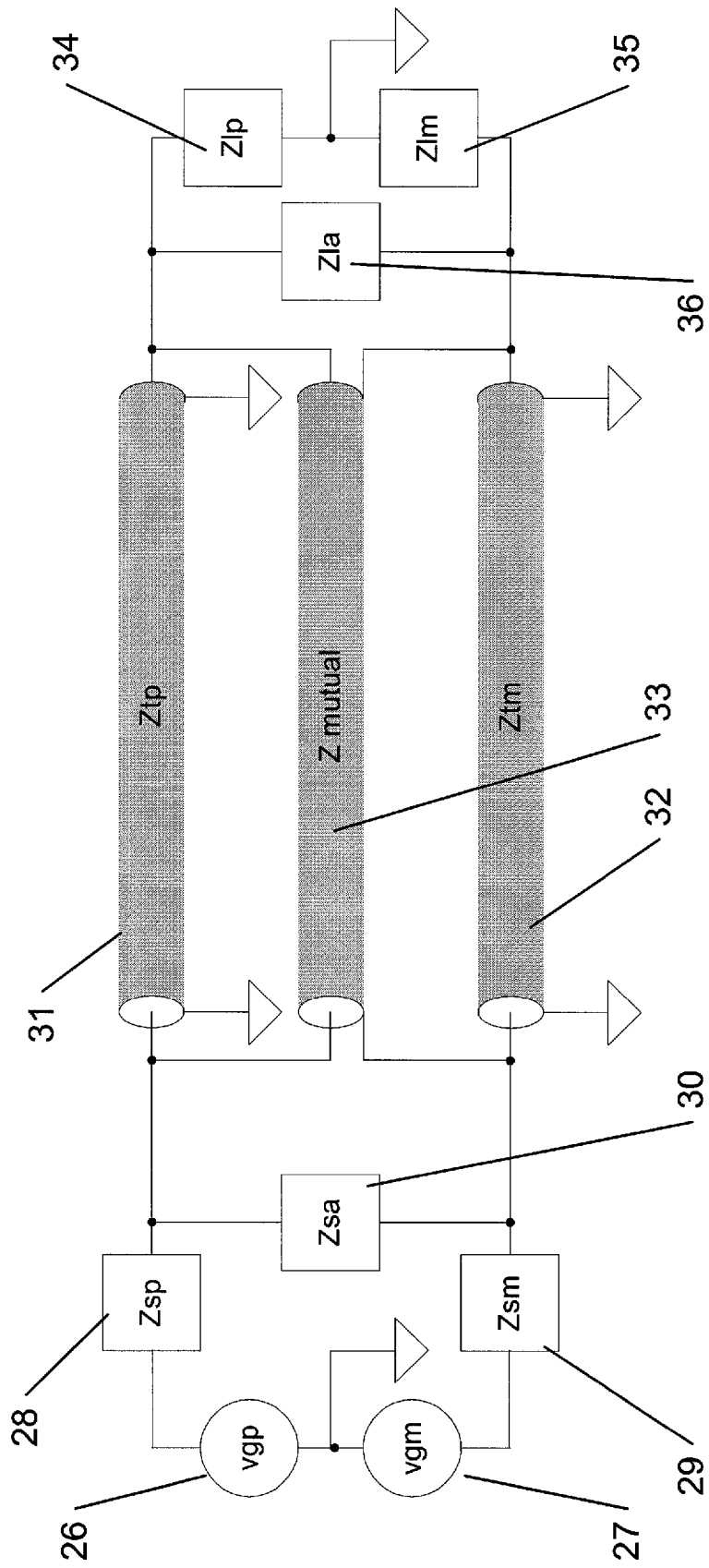
Figure 7 – Typical Differential Circuit to be Measured

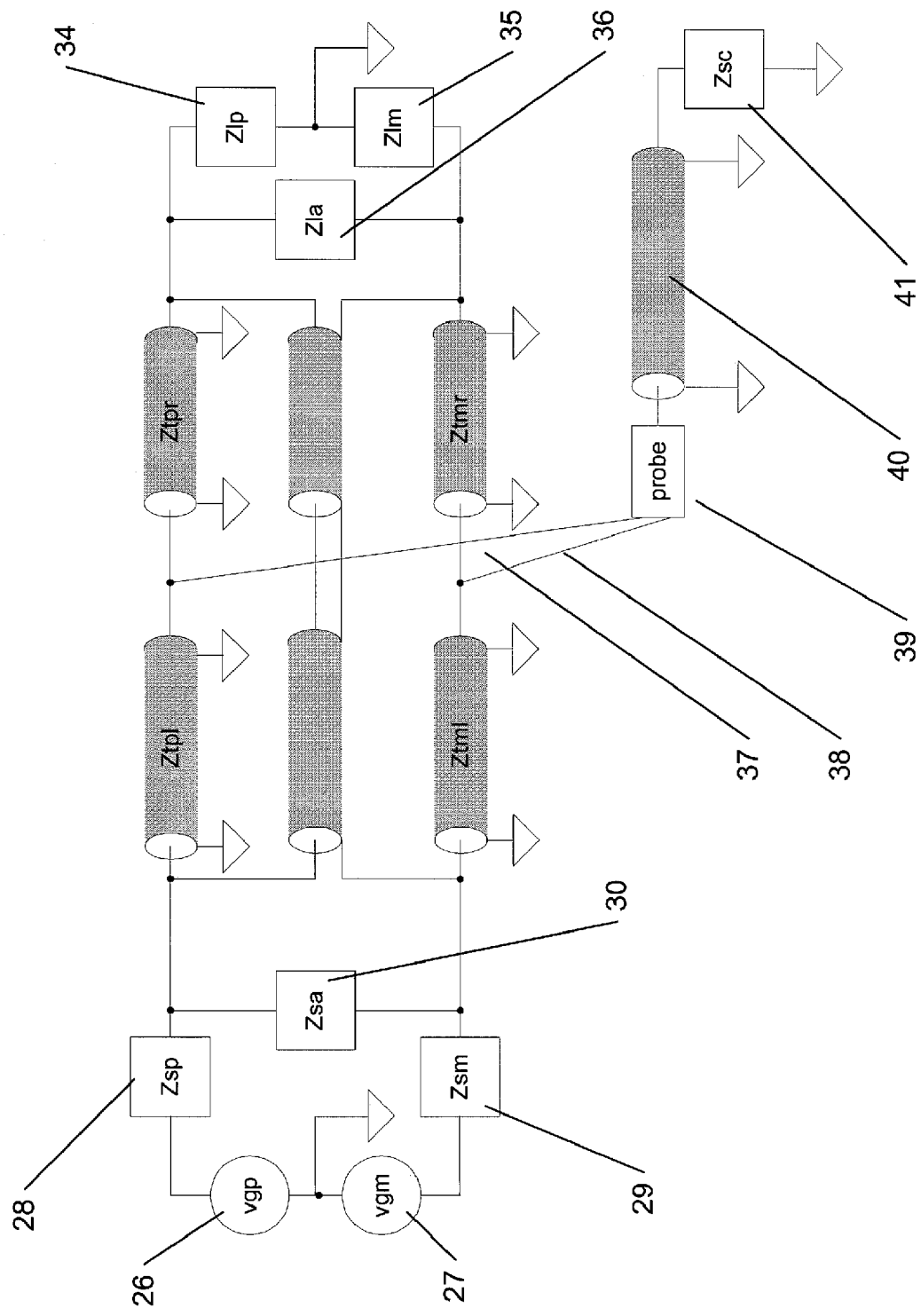
Figure 8 – Typical Differential Measurement Configuration

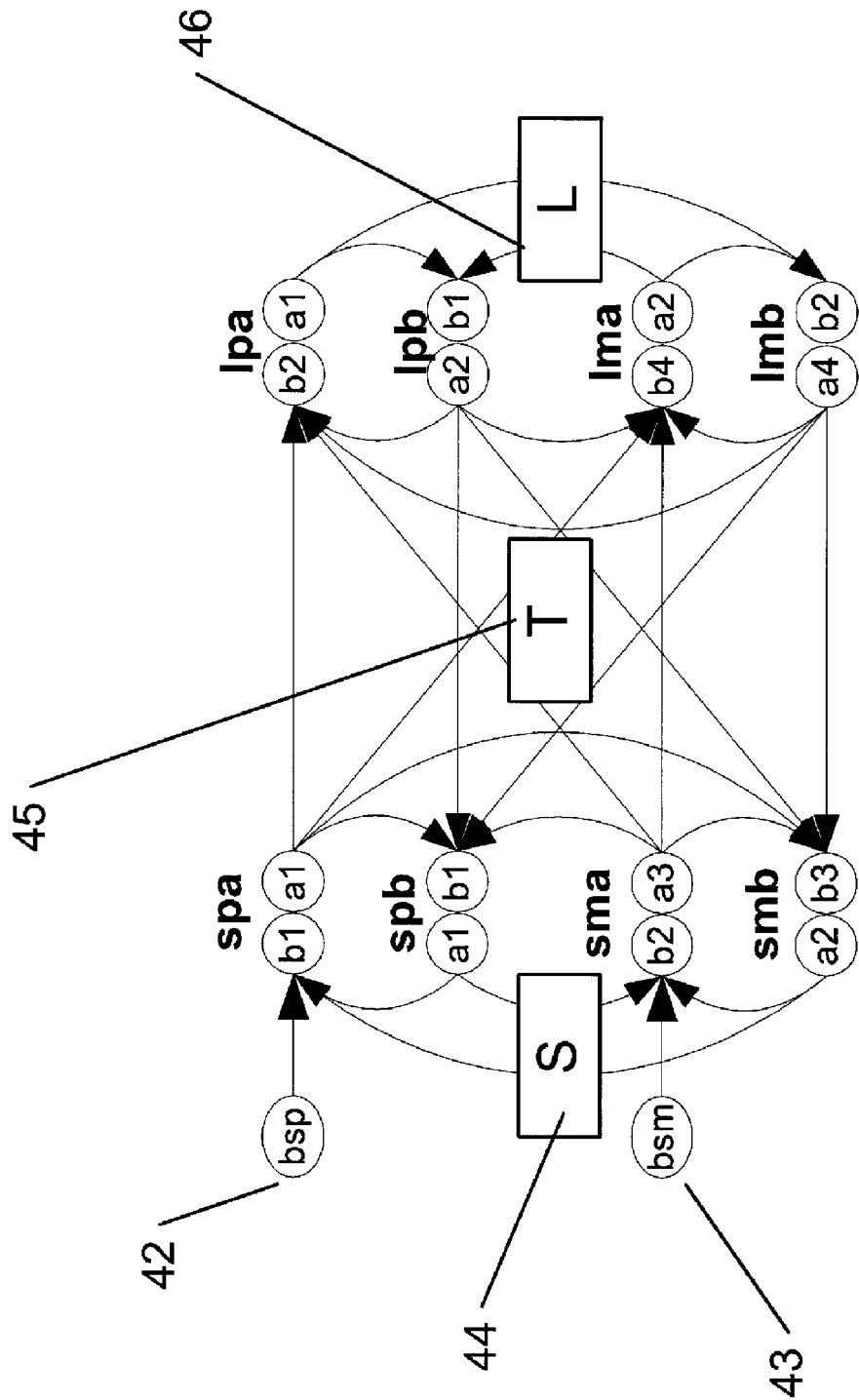
Figure 9 – Signal Flow Diagram of Typical Differential Circuit to be Measured

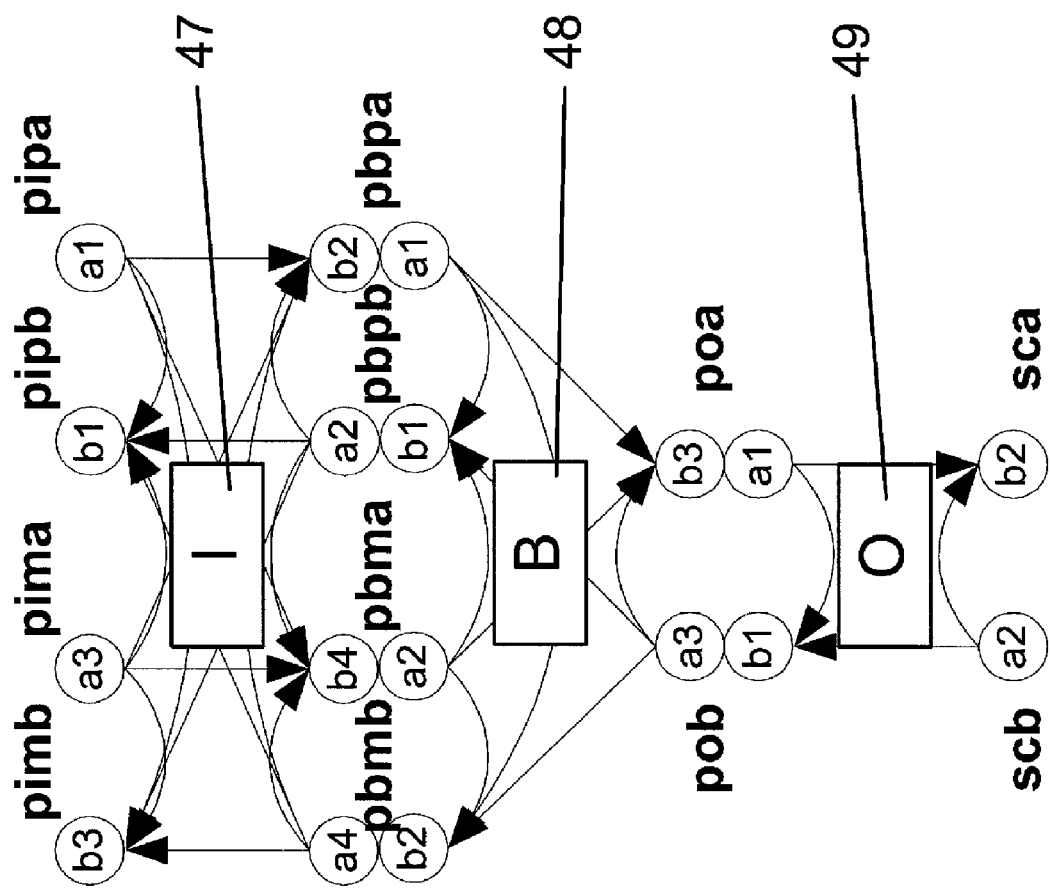
Figure 10 – Signal Flow Diagram of Differential Probe

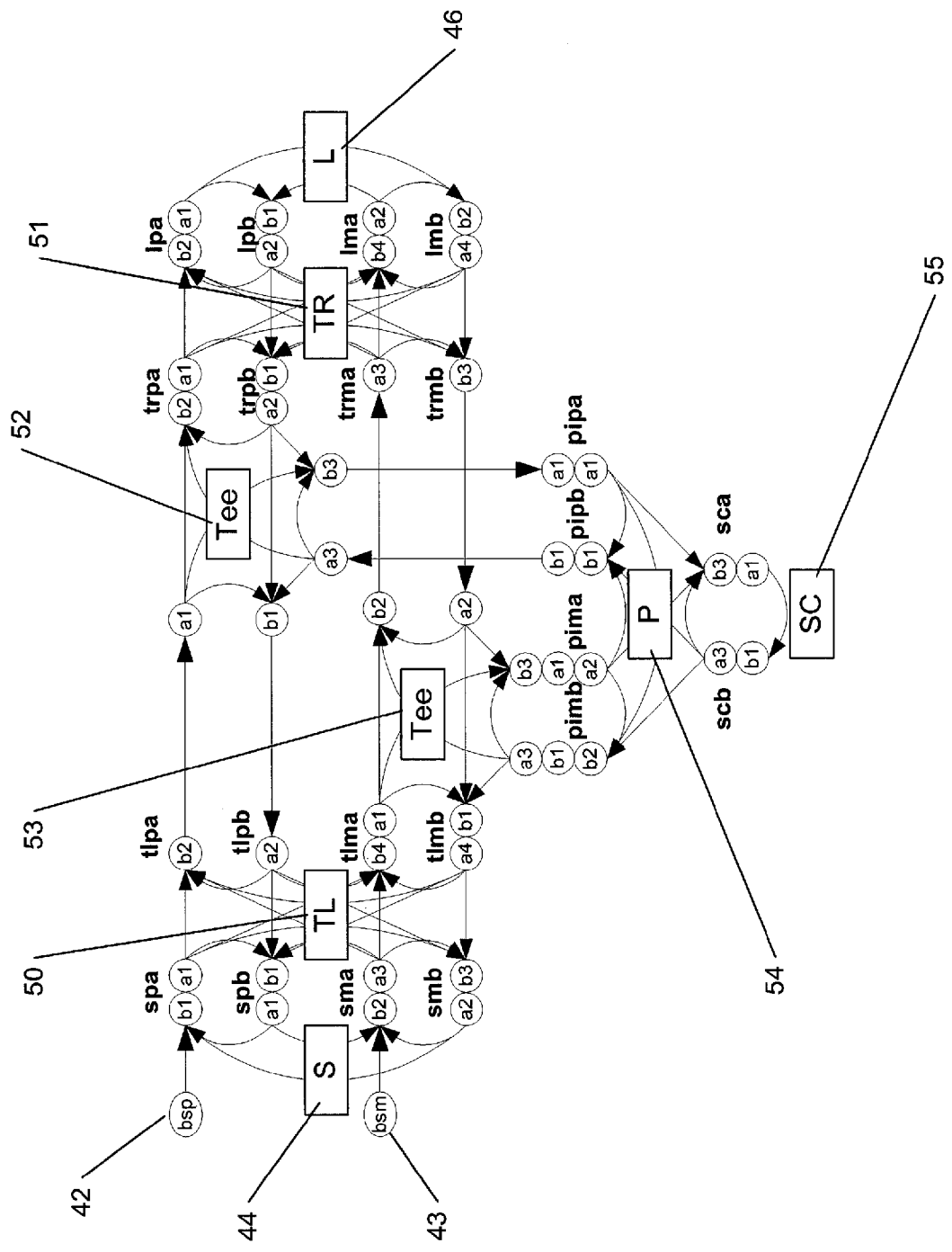
Figure 11 – Signal Flow Diagram of Typical Differential Measurement Configuration

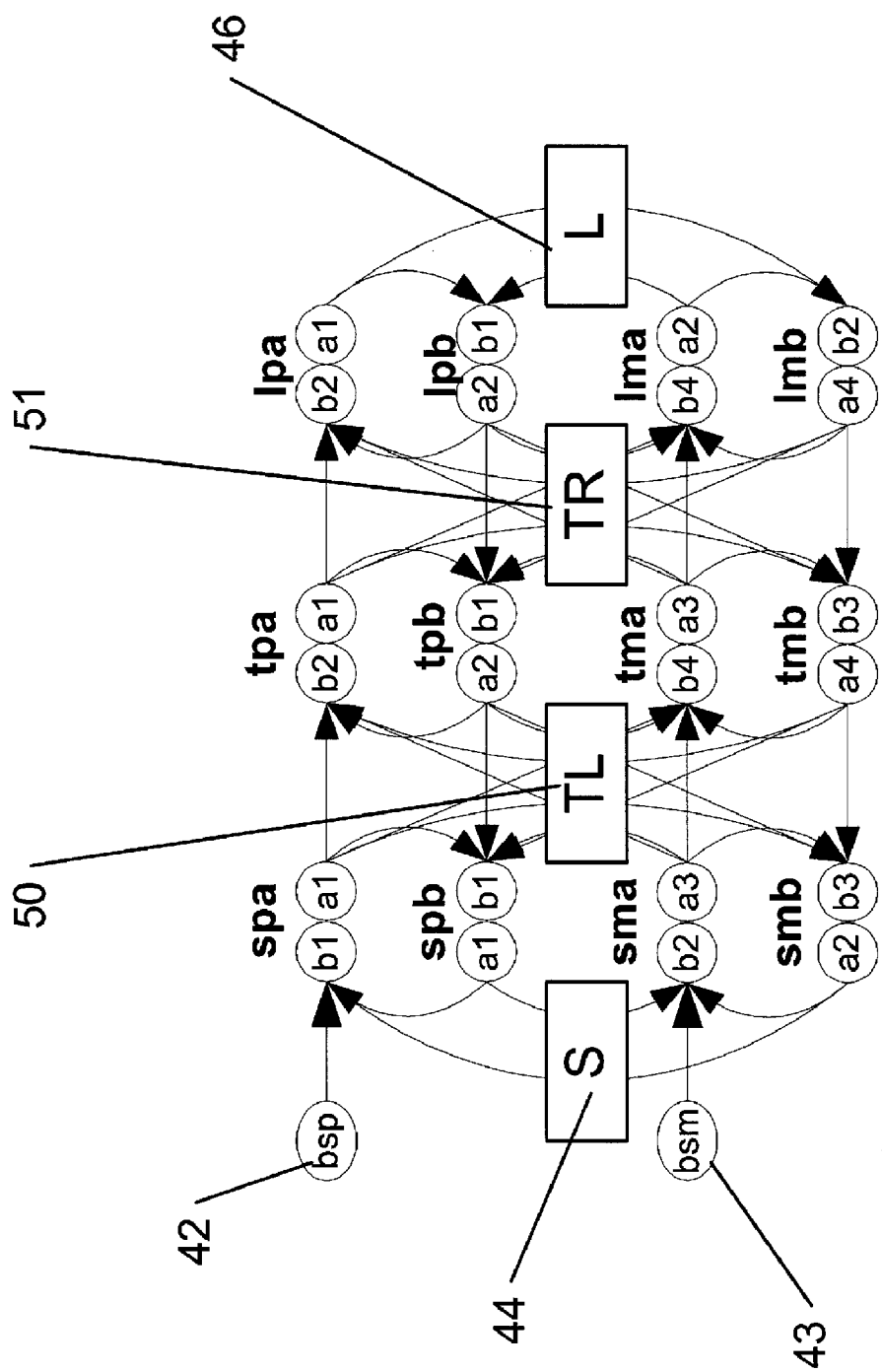
Figure 12 – Signal Flow Diagram of Typical Differential Circuit to be Measured Without Probe Connected

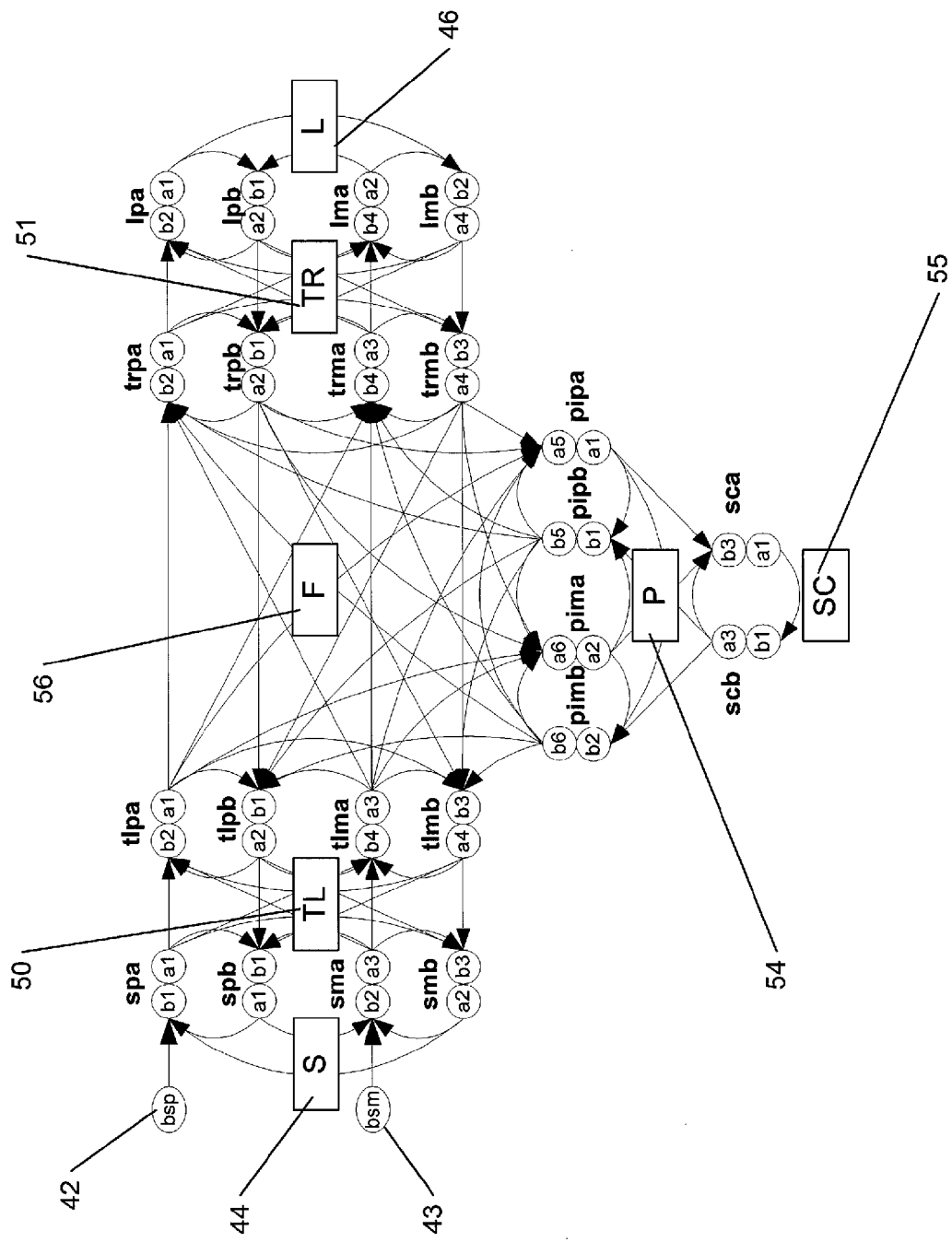
Figure 13 – Signal Flow Diagram of Differential Measurement Configuration Using 6-Port Connection

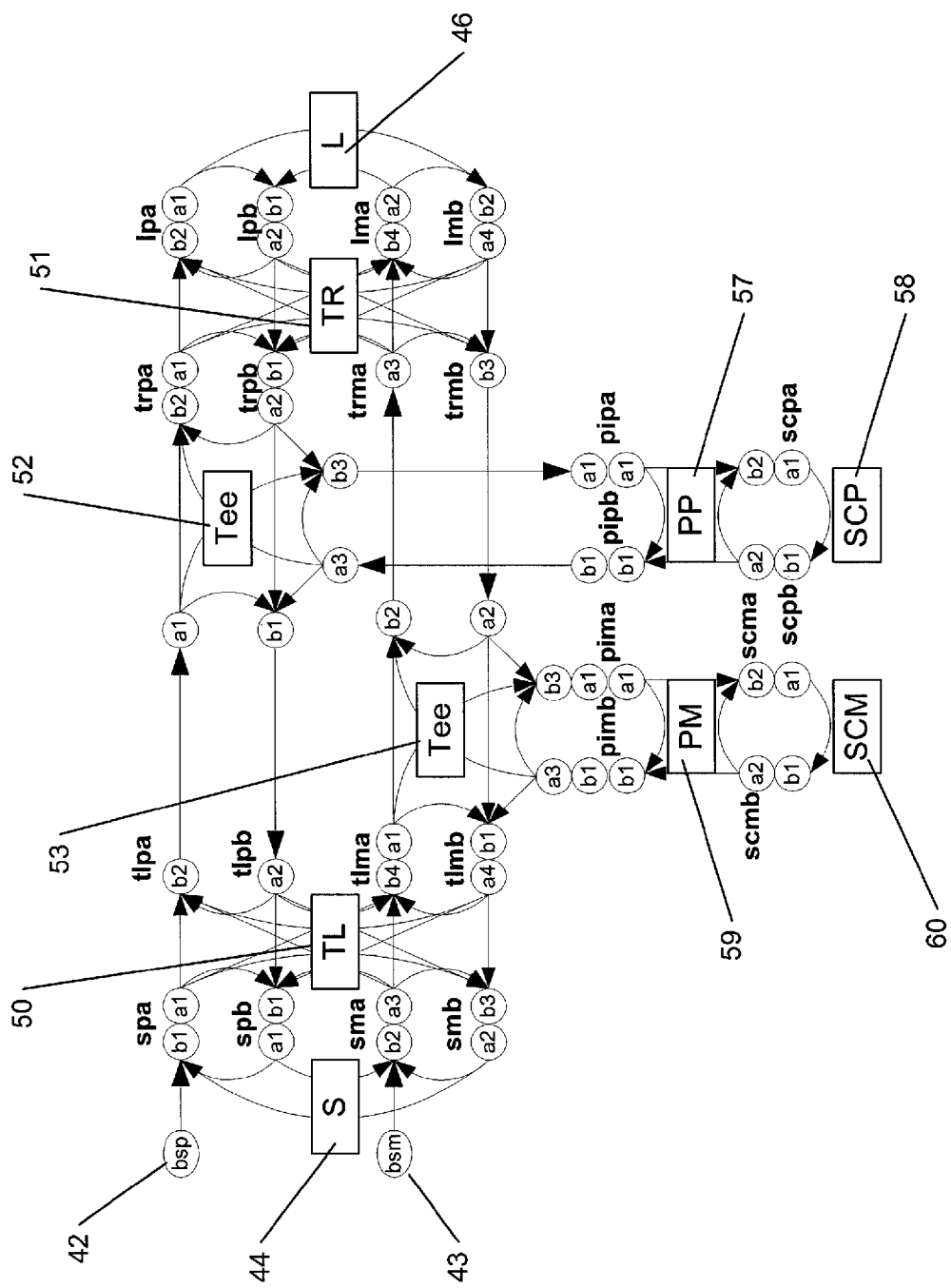
Figure 14 – Signal Flow Diagram of Differential Measurement Configuration with Two Single-Ended Probes balanced case - differential impulse $$bsp_n := \frac{1}{2} \quad bsm_n := \frac{-1}{2}$$

node names creates a rc x rc square matrix, all zeros $$\text{ZeroSquareMatrix}(rc) := \text{identity}(rc) - \text{identity}(rc)$$

creates a r element vector all zeros $$\text{ZeroColumnVector}(r) := \left[(\text{identity}(r) - \text{identity}(r))^{\langle 0 \rangle}\right]$$

fills in the B matrix with the equation M*av+bv=cv $$\text{fillInB}(A,B,M,av,bv,cv) := \begin{vmatrix} \text{for } r \in 0..\,\text{rows}(M) - 1 \\ \quad \begin{vmatrix} ra \leftarrow \text{index}(cv_r) \\ B_{ra} \leftarrow bv_r \end{vmatrix} \\ B \end{vmatrix}$$

$$\text{indexNames} := \begin{pmatrix} \text{"spa"} \\ \text{"spb"} \\ \text{"tlpa"} \\ \text{"tlpb"} \\ \text{"sma"} \\ \text{"smb"} \\ \text{"tlma"} \\ \text{"tlmb"} \\ \text{"trpa"} \\ \text{"trpb"} \\ \text{"lpa"} \\ \text{"lpb"} \\ \text{"trma"} \\ \text{"trmb"} \\ \text{"lma"} \\ \text{"lmb"} \\ \text{"pipa"} \\ \text{"pipb"} \\ \text{"pima"} \\ \text{"pimb"} \\ \text{"sca"} \\ \text{"scb"} \end{pmatrix}$$

reorders the ports in the s parameter matrix $$\text{ReOrder}(s,rv) := \begin{vmatrix} \text{for } r \in 0..\,\text{rows}(s) - 1 \\ \quad \text{for } c \in 0..\,\text{cols}(s) - 1 \\ \qquad ns_{rv_r, rv_c} \leftarrow s_{r,c} \\ ns \end{vmatrix}$$

finds the index of the node name $$\text{index}(\text{name}) := \begin{vmatrix} \text{for } i \in 0..\,\text{last}(\text{indexNames}) \\ \quad (\text{return } i) \text{ if name} = \text{indexNames}_i \\ -1 \end{vmatrix}$$

fills in the A matrix with the equation M*av+bv=cv $$\text{fillInA}(A,B,M,av,bv,cv) := \begin{vmatrix} \text{for } r \in 0..\,\text{rows}(M) - 1 \\ \quad \begin{vmatrix} ra \leftarrow \text{index}(cv_r) \\ \text{for } c \in 0..\,\text{cols}(M) - 1 \\ \quad \begin{vmatrix} ca \leftarrow \text{index}(av_c) \\ A_{ra,ca} \leftarrow -M_{r,c} \end{vmatrix} \\ ca \leftarrow \text{index}(cv_r) \\ A_{ra,ca} \leftarrow 1 \end{vmatrix} \\ A \end{vmatrix}$$

Figure 15 – MathCad Spreadsheet page 1

$$Vc_{withprobe_n} := \begin{vmatrix} A \leftarrow \text{ZeroSquareMatrix}(\text{rows}(\text{indexNames})) \\ B \leftarrow \text{ZeroColumnVector}(\text{rows}(\text{indexNames})) \\ A \leftarrow \text{fillInA}\left[A, B, \text{ReOrder}\left[\text{stl}_n, \begin{pmatrix} 0 \\ 2 \\ 1 \\ 3 \end{pmatrix}\right], \begin{pmatrix} "spa" \\ "tlpb" \\ "sma" \\ "tlmb" \end{pmatrix}, \begin{pmatrix} 0 \\ 0 \\ 0 \\ 0 \end{pmatrix}, \begin{pmatrix} "spb" \\ "tlpa" \\ "smb" \\ "tlma" \end{pmatrix}\right] \\ A \leftarrow \text{fillInA}\left[A, B, \text{ReOrder}\left[\text{str}_n, \begin{pmatrix} 0 \\ 2 \\ 1 \\ 3 \end{pmatrix}\right], \begin{pmatrix} "trpa" \\ "lpb" \\ "trma" \\ "lmb" \end{pmatrix}, \begin{pmatrix} 0 \\ 0 \\ 0 \\ 0 \end{pmatrix}, \begin{pmatrix} "trpb" \\ "lpa" \\ "trmb" \\ "lma" \end{pmatrix}\right] \\ A \leftarrow \text{fillInA}\left[A, B, \text{sp}_n, \begin{pmatrix} "pipa" \\ "pima" \\ "scb" \end{pmatrix}, \begin{pmatrix} 0 \\ 0 \\ 0 \end{pmatrix}, \begin{pmatrix} "pipb" \\ "pimb" \\ "sca" \end{pmatrix}\right] \\ A \leftarrow \text{fillInA}\left[A, B, \text{ss}_n, \begin{pmatrix} "spb" \\ "smb" \end{pmatrix}, \begin{pmatrix} \text{bsp}_n \\ \text{bsm}_n \end{pmatrix}, \begin{pmatrix} "spa" \\ "sma" \end{pmatrix}\right] \\ A \leftarrow \text{fillInA}\left[A, B, \text{sl}_n, \begin{pmatrix} "lpa" \\ "lma" \end{pmatrix}, \begin{pmatrix} 0 \\ 0 \end{pmatrix}, \begin{pmatrix} "lpb" \\ "lmb" \end{pmatrix}\right] \\ A \leftarrow \text{fillInA}\left[A, B, \begin{pmatrix} \frac{-1}{3} & \frac{2}{3} & \frac{2}{3} \\ \frac{2}{3} & \frac{-1}{3} & \frac{2}{3} \\ \frac{2}{3} & \frac{2}{3} & \frac{-1}{3} \end{pmatrix}, \begin{pmatrix} "tlpa" \\ "trpb" \\ "pipb" \end{pmatrix}, \begin{pmatrix} 0 \\ 0 \\ 0 \end{pmatrix}, \begin{pmatrix} "tlpb" \\ "trpa" \\ "pipa" \end{pmatrix}\right] \\ A \leftarrow \text{fillInA}\left[A, B, \begin{pmatrix} \frac{-1}{3} & \frac{2}{3} & \frac{2}{3} \\ \frac{2}{3} & \frac{-1}{3} & \frac{2}{3} \\ \frac{2}{3} & \frac{2}{3} & \frac{-1}{3} \end{pmatrix}, \begin{pmatrix} "tlma" \\ "trmb" \\ "pimb" \end{pmatrix}, \begin{pmatrix} 0 \\ 0 \\ 0 \end{pmatrix}, \begin{pmatrix} "tlmb" \\ "trma" \\ "pima" \end{pmatrix}\right] \\ A \leftarrow \text{fillInA}\left[A, B, (\text{Gsc}_n), ("sca"), (0), ("scb")\right] \\ B \leftarrow \text{fillInB}\left[A, B, \text{ss}_n, \begin{pmatrix} "spb" \\ "smb" \end{pmatrix}, \begin{pmatrix} \text{bsp}_n \\ \text{bsm}_n \end{pmatrix}, \begin{pmatrix} "spa" \\ "sma" \end{pmatrix}\right] \\ vd \leftarrow \begin{pmatrix} 1 & 1 & 0 & 0 & -1 & -1 & 0 & 0 & 0 & 0 & 0 & 0 & 0 & 0 & 0 & 0 & 0 & 0 & 0 \\ 0 & 0 & 1 & 1 & 0 & 0 & -1 & -1 & 0 & 0 & 0 & 0 & 0 & 0 & 0 & 0 & 0 & 0 & 0 \\ 0 & 0 & 0 & 0 & 0 & 0 & 0 & 0 & 0 & 1 & 1 & 0 & 0 & -1 & -1 & 0 & 0 & 0 & 0 \\ 0 & 0 & 0 & 0 & 0 & 0 & 0 & 0 & 0 & 0 & 0 & 0 & 0 & 0 & 0 & 0 & 0 & 2 & 2 \end{pmatrix} \\ vd \cdot A^{-1} \cdot B \end{vmatrix}$$

Figure 16 - MathCad Spreadsheet page 2

$$Vc_{noprobe_n} := \begin{vmatrix} A \leftarrow \text{ZeroSquareMatrix}(\text{rows}(\text{indexNames})) \\ B \leftarrow \text{ZeroColumnVector}(\text{rows}(\text{indexNames})) \\ A \leftarrow \text{fillInA}\left[A, B, \text{ReOrder}\left(\text{stl}_n, \begin{pmatrix} 0 \\ 2 \\ 1 \\ 3 \end{pmatrix}\right), \begin{pmatrix} \text{"spa"} \\ \text{"tlpb"} \\ \text{"sma"} \\ \text{"tlmb"} \end{pmatrix}, \begin{pmatrix} 0 \\ 0 \\ 0 \\ 0 \end{pmatrix}, \begin{pmatrix} \text{"spb"} \\ \text{"tlpa"} \\ \text{"smb"} \\ \text{"tlma"} \end{pmatrix}\right] \\ A \leftarrow \text{fillInA}\left[A, B, \text{ReOrder}\left(\text{str}_n, \begin{pmatrix} 0 \\ 2 \\ 1 \\ 3 \end{pmatrix}\right), \begin{pmatrix} \text{"trpa"} \\ \text{"lpb"} \\ \text{"trma"} \\ \text{"lmb"} \end{pmatrix}, \begin{pmatrix} 0 \\ 0 \\ 0 \\ 0 \end{pmatrix}, \begin{pmatrix} \text{"trpb"} \\ \text{"lpa"} \\ \text{"trmb"} \\ \text{"lma"} \end{pmatrix}\right] \\ A \leftarrow \text{fillInA}\left[A, B, \begin{pmatrix} 1 & 0 & 0 \\ 0 & 1 & 0 \\ \frac{1}{2} & \frac{-1}{2} & 0 \end{pmatrix}, \begin{pmatrix} \text{"pipa"} \\ \text{"pima"} \\ \text{"scb"} \end{pmatrix}, \begin{pmatrix} 0 \\ 0 \\ 0 \end{pmatrix}, \begin{pmatrix} \text{"pipb"} \\ \text{"pimb"} \\ \text{"sca"} \end{pmatrix}\right] \\ A \leftarrow \text{fillInA}\left[A, B, \text{ss}_n, \begin{pmatrix} \text{"spb"} \\ \text{"smb"} \end{pmatrix}, \begin{pmatrix} \text{bsp}_n \\ \text{bsm}_n \end{pmatrix}, \begin{pmatrix} \text{"spa"} \\ \text{"sma"} \end{pmatrix}\right] \\ A \leftarrow \text{fillInA}\left[A, B, \text{sl}_n, \begin{pmatrix} \text{"lpa"} \\ \text{"lma"} \end{pmatrix}, \begin{pmatrix} 0 \\ 0 \end{pmatrix}, \begin{pmatrix} \text{"lpb"} \\ \text{"lmb"} \end{pmatrix}\right] \\ A \leftarrow \text{fillInA}\left[A, B, \begin{pmatrix} \frac{-1}{3} & \frac{2}{3} & \frac{2}{3} \\ \frac{2}{3} & \frac{-1}{3} & \frac{2}{3} \\ \frac{2}{3} & \frac{2}{3} & \frac{-1}{3} \end{pmatrix}, \begin{pmatrix} \text{"tlpa"} \\ \text{"trpb"} \\ \text{"pipb"} \end{pmatrix}, \begin{pmatrix} 0 \\ 0 \\ 0 \end{pmatrix}, \begin{pmatrix} \text{"tlpb"} \\ \text{"trpa"} \\ \text{"pipa"} \end{pmatrix}\right] \\ A \leftarrow \text{fillInA}\left[A, B, \begin{pmatrix} \frac{-1}{3} & \frac{2}{3} & \frac{2}{3} \\ \frac{2}{3} & \frac{-1}{3} & \frac{2}{3} \\ \frac{2}{3} & \frac{2}{3} & \frac{-1}{3} \end{pmatrix}, \begin{pmatrix} \text{"tlma"} \\ \text{"trmb"} \\ \text{"pimb"} \end{pmatrix}, \begin{pmatrix} 0 \\ 0 \\ 0 \end{pmatrix}, \begin{pmatrix} \text{"tlmb"} \\ \text{"trma"} \\ \text{"pima"} \end{pmatrix}\right] \\ A \leftarrow \text{fillInA}[A, B, (0), (\text{"sca"}), (0), (\text{"scb"})] \\ B \leftarrow \text{fillInB}\left[A, B, \text{ss}_n, \begin{pmatrix} \text{"spb"} \\ \text{"smb"} \end{pmatrix}, \begin{pmatrix} \text{bsp}_n \\ \text{bsm}_n \end{pmatrix}, \begin{pmatrix} \text{"spa"} \\ \text{"sma"} \end{pmatrix}\right] \\ vd \leftarrow \begin{pmatrix} 1 & 1 & 0 & 0 & -1 & -1 & 0 & 0 & 0 & 0 & 0 & 0 & 0 & 0 & 0 & 0 & 0 & 0 & 0 \\ 0 & 0 & 1 & 1 & 0 & 0 & -1 & -1 & 0 & 0 & 0 & 0 & 0 & 0 & 0 & 0 & 0 & 0 & 0 \\ 0 & 0 & 0 & 0 & 0 & 0 & 0 & 0 & 1 & 1 & 0 & 0 & -1 & -1 & 0 & 0 & 0 & 0 & 0 \end{pmatrix} \\ vd \cdot A^{-1} \cdot B \end{vmatrix}$$

Figure 17 - MathCad Spreadsheet page 3

$H_{rolloff}(f)$ is an arbitrary filter that applies the appropriate roll-off characteristics to avoid too much gain $$voltageNames := \begin{pmatrix} \text{"VPs"} \\ \text{"VPt"} \\ \text{"VPl"} \\ \text{"VPsc"} \\ \text{"VNPs"} \\ \text{"VNPt"} \\ \text{"VNPl"} \end{pmatrix}$$

$NV := rows(voltageNames)$ $nv := 0 .. NV - 1$ voltages present in the circuit due to bsp and bsm $$V_{n,nv} := \left(stack\left(Vc_{withprobe_n}, Vc_{noprobe_n}\right)\right)_{nv} \cdot H_{rolloff}(f_n)$$

transfer characteristics for filters that convert VPsc into other voltages in the circuit.

$$H_{n,nv} := \frac{V_{n,nv}}{V_{n,index(voltageNames, \text{"VPsc"})}} \cdot H_{rolloff}(f_n)$$

Figure 18 - MathCad Spreadsheet page

VIRTUAL PROBING

CROSS-REFERENCE TO RELATED APPLICATIONS

This application is a continuation of U.S. patent application Ser. No. 11/888,547, filed Aug. 1, 2007 by Peter Pupalaikis et al., entitled "Virtual Probing", currently pending, which in turn claims the benefit of U.S. Provisional Patent Application No. 60/835,029, filed Aug. 2, 2006, entitled METHOD AND APPARATUS FOR PROBE COMPENSATION, and U.S. Provisional Patent Application No. 60/861,678, filed Nov. 29, 2006, entitled PROBE COMPENSATION, the entire contents of each of these applications being incorporated herein by reference.

FIELD OF THE INVENTION

The present invention relates to probes and probing systems especially as it relates to their usage with digital storage oscilloscopes.

BACKGROUND OF THE INVENTION

A digital storage oscilloscope (DSO) is one of the most commonly used instruments by engineers and scientists to display and analyze waveforms in electrical circuits. Often, a probe is utilized to connect the DSO to a circuit being measured and provides a mechanism for transmitting the signal in the circuit to the oscilloscope input.

There are certain important features or characteristics of probes worth noting. The first characteristic is the probe's loading. Since the probe is connected to a circuit under test, the loading can affect the circuit or change its operation. Since the probe usually shunts the circuit, the loading is best when the probe looks like a high impedance shunt element to the circuit. Another feature of interest is the ability of the probe to be connected at the correct measurement point and is usually addressed by making the tip of a probe as small as possible and by providing electrical contacts in the circuit that can be placed as close as possible to the desired measurement point. Still another feature is the impedance match of the probe output to the DSO channel input. When the probe's output impedance is matched to the DSO channel input, the transmitted signal passes into the scope undisturbed. Finally, and no less important is the general signal fidelity aspects internal to the probe such as magnitude and phase response.

Generally, when all of the aforementioned probe characteristics are good, the probe is useful for use with the DSO in the acquisition and measurement of signals occurring in the circuit under test.

As of late, high performance DSOs and probes are being utilized to measure extremely fast circuits and signals. The speed of these circuits is described by the frequency and risetimes of signals present in the circuits. When the frequencies of interest are very high and the risetimes are very short, it becomes very difficult to develop DSOs and probes with precision and accuracy sufficient for making accurate measurements. Specifically, many of the characteristics previously described become degraded.

At high frequencies, a probe's loading usually gets worse, causing the probe to interact more and more with the circuit being measured. When loading effects worsen, the probe sets up reflections due to impedance discontinuities in the circuit at the probing point. High speed measurements are often made on very small circuit features which make it difficult to access the desired measurement point. Often the desired measurement point is inside a chip and is completely inaccessible. It is not possible to make a perfect impedance match to the scope at high frequencies. This is a problem with the DSO design as well as the probe design. Finally, the probe exhibits more and more signal fidelity degradations internally as frequencies increase.

The problem of internal probe signal fidelity degradation has been addressed through the use of digital compensation. These are digital signal processing (DSP) methods that build filters to compensate for the probes response. The DSP methods are utilized inside the DSO using digital filters stored in the probe and are generated during a probe calibration step in the manufacture of the probe. Alternatively, these filters are derived from probe response information stored in the probe and generated during a probe calibration step in the manufacture of the probe.

In a coarse manner, the filters or responses that are stored in the probe have been utilized to compensate for probe loading effects. However, this compensation can only act in a coarse manner because the compensation methods currently used address only a fixed compensation that addresses the loading as if the probe was being utilized in the exact environment in which it was calibrated.

These filters may comprise analog or digital filters. Analog compensators, such as those described in U.S. Pat. No. 6,856,126 issued to McTigue, for example, comprise fixed filters, and are therefore not adjustable in accordance with the present invention. Even prior digital compensators fail to address the issues noted above. Typically, this type of digital probe compensation is handled in two ways—either the scope and probe combination is calibrated together on a given channel (the probe compensation is valid only so long as the probe is connected to the scope channel on which it is calibrated—it cannot be moved to another channel or another scope), or the scope/probe interface is designed to extremely high tolerances so that it can be ignored and is not considered and the probe compensator forms a fixed response.

US patents to Sekel (U.S. Pat. No. 6,870,359) and Pupalaikis (U.S. Pat. No. 6,701,335) provide for dynamic self calibration which is capable of compensating nearly from the probe tip through the scope (there will always be some portion of the tip not included in his calibration method). These methods are capable of accounting for the separate probe parts and the scope probe interface because the calibration signal could be injected near the tip and measured through the entire channel. However, this type of calibration requires complex circuitry and procedures to accomplish the compensation. While this method does provide a benefit of accounting for changing conditions of the parts over time and temperature as his does, the system is not one which can be easily implemented at, for example, a remote location not having an appropriate test and calibration fixture.

What is needed is a solution for addressing the probe loading problems in a general sense (i.e. considering the circuit under test). What is needed is a solution for probing inaccessible points. What is needed is a solution for dealing with the mismatch between the DSO and the probe. What is needed is a solution for determining the error bounds on measurements utilizing probes.

As a final note, the probe is generally manufactured with separate parts that are assembled. Often these parts are assembled by the scope and probe user at the time of use. Mechanisms have been provided for the storage of separate information corresponding to the individual probe parts. What is needed is a solution that combines measurements of separate probe portions into an aggregate probe measurement and using this probe measurement for effective probe compensation.

OBJECTS OF THE INVENTION

It is an object of this invention to provide a method of probe compensation that provides for accurate measurements when the probe is utilized in a wide variety of situations.

It is another object of this invention to compensate for probe loading effects in a general sense.

It is a further object of this invention to provide for signal measurements in inaccessible locations (i.e. at points where the probe cannot be physically connected).

It is a further object of this invention to provide for compensation of the impedance mismatch between the DSO and the probe.

It is a further object of this invention to provide compensation even when the individual probe parts are interchangeable.

It is a further object of this invention to provide for the determination of error bounds on measurements utilizing probes.

Still other objects and advantages of the invention will in part be obvious and will in part be apparent from the specification and the drawings.

SUMMARY OF THE INVENTION

In accordance with the invention, a method and apparatus are provided that consider the oscilloscope and probe interface in its entirety by measuring at least the return loss of the probe output and the scope input, storing these measurements in the oscilloscope and probe, and processing these measurements to form a better compensation. This method and apparatus also allow for independent measurement and calibration of each of the probe's parts, each of these measurements later being combined to provide a composite measurement of the probe.

Therefore, the invention includes the capability to provide virtual probe compensation, i.e. providing voltages that are present at any other points in a circuit other than where the probe tips are able to be connected. Thus, it is possible to determine a voltage value at a point in a circuit, even if it is not possible to directly connect a probe thereto. Also, this invention is capable of determining voltages that would be present at the location of the probe connection as well as other points in the circuit as if the probe were not connected. This is because even perfect calibration of a probe to a probe tip, as addressed by the prior art noted above, cannot provide measurements of the voltage present at other nodes into the circuit, or as if the probe were not connected without considering the characteristics of the circuit under test. It is only the present invention that can provide these benefits.

Therefore, in accordance with the invention circuit and probe characteristics may be provided, filters may be calculated and applied to digitized waveforms to produce other waveforms representative of other voltages in the system, especially the concepts of generating these waveforms for other locations in the circuit, and/or as if the probe were not connected.

The general situation is shown in FIG. 1. In FIG. 1, a typical desire is to measure the voltage at the load. A probe is inserted into the middle of the transmission line as shown in FIG. 2. It is shown inserted into the middle of the line to represent the situation in which the probe cannot physically access the terminals at the load or to represent that it is more advantageous to probe the system at a different location than the load.

When the probe is connected to the DSO, the terminal point is the load inside the DSO.

A probe often consists of multiple parts. It typically consists of the tip, the body, and a cable from the body to the scope connection. In a calibration phase, all of these probe parts are characterized and the data that characterized the probe parts are stored in a non-volatile storage element inside the probe and accessible by the scope when the probe is inserted. Similarly, in a calibration phase of the scope, the scope input is characterized and the data is stored inside the scope.

When the probe is inserted into the scope, connecting it to a scope channel, the scope detects the probe insertion and reads out the data stored in the probe. Often this data is represented by s parameters and the s parameters of the probe form a system represented by a signal flow graph as shown in FIG. 4. The signal flow diagram of the probe parts are reduced to a single two-port representation. This representation along with the reflection coefficient of the scope input are utilized in a flow diagram as shown in FIG. 5. FIG. 5, shows the scope and probe along with an idealized tee used to pick off the transmission line. The diagram without the probe connected is represented in FIG. 3.

It is becoming increasingly common that engineers utilizing the measurement equipment have measurements or can obtain measurements of the s parameters of the circuit under test. These can be generated by a vector network analyzer (VNA) or through simulation. In some instances, they can be estimated crudely, such as stating that the transmission line is such a length with such a characteristic impedance. Either way, the diagram of FIG. 5 can be thought to represent the complete circuit under test with the probe connected.

Utilizing the flow diagrams of FIG. 3 and FIG. 5, the system can be solved for a variety of voltage relationships with respect to the voltages of any sources applied. Furthermore, the flow diagrams can be solved for a variety of voltage relationships, all of which are relative to the voltage appearing at the scope input in FIG. 5, independent of the source voltage applied. Using these voltage relationships, digital filters are generated and combined with scopes internal filters used for compensation of input signals to provide a substantially correct version of the signal appearing at any of the nodes shown in FIG. 3 or FIG. 5 due to a voltage digitized by the oscilloscope.

FIG. 3 and FIG. 5, along with accompanying s parameter measurements of the circuit elements, present an accurate circuit description to the level of accuracy of s parameter measurements. If s parameter measurements are simulated or approximated, it is possible to further calculate the errors present in the compensation, thus placing error bounds on the measurements, both in the frequency domain and the time domain.

This summary provided pertains to the simple case of a single-ended system with a single-ended probe and one generator. It will become apparent in the detailed description of the many embodiments that more complicated systems can also be compensated.

BRIEF DESCRIPTION OF DRAWINGS

For a more complete understanding of the invention, reference is made to the following description and accompanying drawings, in which:

FIG. 1 is a typical single-ended circuit to be measured;

FIG. 2 is a typical single-ended measurement configuration;

FIG. 3 is a signal flow graph representing the typical single-ended circuit to be measured in FIG. 1;

FIG. 4 is a signal flow diagram containing single-ended probe parts;

FIG. 5 is a signal flow diagram representing the typical single-ended measurement configuration as shown in FIG. 2;

FIG. 6 is a signal flow diagram representing the circuit in FIG. 1 with the probing point identified;

FIG. 7 is a typical differential circuit to be measured;

FIG. 8 is a typical differential measurement configuration;

FIG. 9 is a signal flow graph representing the typical single-ended circuit to be measured in FIG. 7;

FIG. 10 is a signal flow diagram containing differential probe parts;

FIG. 11 is a signal flow diagram representing the typical differential measurement configuration as shown in FIG. 8;

FIG. 12 is a signal flow diagram representing the circuit in FIG. 7 with the probing point identified;

FIG. 13 is a signal flow graph showing a differential probing configuration utilizing a 6-port to represent the probe connection;

FIG. 14 is a signal flow graph showing a differential probing configuration utilizing two single-ended probes;

FIG. 15 depicts a first page of a MathCad spreadsheet in accordance with an embodiment of the invention;

FIG. 16 depicts a second page of the MathCad spreadsheet of FIG. 15;

FIG. 17 depicts a third page of the MathCad spreadsheet of FIG. 15; and

FIG. 18 depicts a fourth page of the MathCad spreadsheet of FIG. 15.

DETAILED DESCRIPTION OF THE PREFERRED EMBODIMENTS

FIG. 1 shows a typical single-ended circuit to be measured. The circuit is single-ended because all voltages of interest along the circuit are referenced to ground. The circuit consists of a voltage source [1] in conjunction with a source impedance [2] driving a transmission line [3] into a load [4] with a given load impedance. The transmission line is a typical medium for data communications. A transmission line will have a characteristic impedance and an electrical length. It is understood that the circuit is shown simplistically and that the transmission line actually represents a much more complicated situation. It will be shown that the simplicity of the situation represented by FIG. 1 in no way degrades the validity of the compensation as FIG. 1 is only a graphical method to visualize the situation.

In order to measure a voltage in this circuit, a probe is inserted as shown in FIG. 2. The probe is shown as a box, representing the probe body [5], connected through a line, representing the probe tip [6] and driving a transmission line (usually a cable) [7] of its own into a load at the scope channel input [13]. The probe tip [6] is shown as breaking the transmission line of the circuit into two portions—a left [8] and a right [9] portion and is shown connected to the circuit in a "tee" arrangement [10]. The left [8] and right [9] portions of the transmission line in FIG. 2 equals the entire transmission line [3] in FIG. 1. Generally, a tee would never be utilized to split a microwave circuit because it generates an impedance discontinuity, but the probe impedance has been purposely designed to be very high. If it were infinitely high, the tee in conjunction with the infinitely high impedance degenerates to a microwave element that has no effect on the transmission line at all. This can be seen more clearly by analysis of subsequent signal flow diagrams.

In FIG. 2, the probe is shown breaking the transmission line to represent a multitude of situations. One situation is that the engineer making a measurement intended to measure the voltage at a particular location along the line at the point of probe connection [10]. Other situations that are equally likely is that the engineer intended to measure the voltage at the entry to the transmission line [11] (i.e. the source) or at the load [12]. As mentioned previously, it is often not possible to get physical access to the source or load directly. Another possibility that will be shown to be enabled by this invention is that the engineer wants to measure the voltage at the load, but the signal is so attenuated by the transmission line that he cannot get a low noise measurement at this point. What the engineer would like is to measure the voltage at a location where the signal was larger relative to the noise and infer the voltage at a point that was more attenuated. A measurement at the source would generally provide such a situation and is not precluded here. If the user can get direct access to the source at [11], then the situation where the left portion of the transmission line [8] is nothing and is simply a special case of that shown in FIG. 2.

When the probe is inserted as in FIG. 2, the signal at the probing point [10] is transmitted to the scope input [13] and digitized by the scope, thus measuring the waveform voltage. This arrangement, however, has been shown to have many sources of degradation of the measurement accuracy. Two already mentioned are probe loading and the location of the measurement. Since the probe cannot present infinite impedance, it serves to load the circuit at the probing point. The probe impedance sets up an impedance discontinuity in the circuit and therefore causes reflections. Since the probe may not be positioned exactly at the load or source, the measurement may not even be measuring the voltage of interest, but also the effect of reflections tends to worsen the further one gets from the source or load point. The probe itself and the transmission line it drives are connected to the scope making a generally imperfect impedance match, so the scope itself sets up reflections. Usually, the probe is designed with very high reverse isolation, so these reflections usually don't present a problem to the circuit, but they may present a problem in the measurement.

Because of all of the difficulties mentioned, circuit designers increasingly rely on simulation and modeling. This simulation and modeling cannot supplant actual measurements because they can only be used to the extent that the simulation or model matches reality and only measurement can determine how well it matches. Some things, however, are easier to simulate and model (and measure) than others. For example, many techniques exist to measure characteristics of circuits. The specific techniques especially relevant to this invention are measurements of linear circuit characteristics as are performed utilizing a vector network analyzer (VNA), time domain reflectometry instrument (TDR), or time domain network analyzer (TDNA). These instruments are capable of determining the behavior of multi-port systems to various stimuli. In a sense, they are utilized to generate a model to describe what voltages would be measured if various stimuli were applied. What is being proposed here is a method of combining VNA or TDR measurements that determine the behavior of the system to various stimuli with actual scope measurements determined by the system behavior and the actual system stimuli to predict how the scope measurement is affected and further counteract or compensate for the effects.

The invention relies on VNA or TDR measurements that produce multi-port measurements usually represented by scattering parameters (or s parameters) and on methods of constructing and analyzing system models utilizing these s parameters and methods of signal flow graph analysis. Both s parameters and signal flow graphs are well known to those skilled in the art of the engineering of microwave systems. A signal flow graph representation of the system in FIG. 1 is shown in FIG. 3. The flow graph shows a two port model of the transmission line, a reflection coefficient for the source and load and a driving source. The diagram has four dependent variables, the forward and backward propagating wave at the source (sa and sb, respectively) and the forward and backward propagating wave at the load (la and lb, respectively). The actual voltage measured at the source is the sum of the voltages sa and sb multiplied by the square root of a normalizing reference impedance $Z_0$ used in the s parameter measurements (usually 50 Ohms). The same is true for the voltages at the load.

Nomenclature used in these signal flow diagrams is as follows. First, a multi-port device is shown as a device with circular terminals labeled with either an "a" or a "b", and a number. The "a" represents a wave input to the port and a "b" represents a wave output from the port. The number represents the port number. Devices are connected by abutting "a" terminals of one device with "b" terminals of the other device and vice-versa. Devices are labeled with a box in the middle indicating the name of the device. Inside the device, arrows are shown connecting the terminals. Each arrow shown internal to the device indicates multiplication of a wave propagating from an "a" terminal to a "b" terminal with the understanding that the wave is multiplied by an s parameter of the device. The implied s parameter that is not shown for a connection from a port "a[x]" to port "b[y]" internal to a device labeled "[N]" is "s[n][y][x]". For example, FIG. 3, the implied s parameter between the port labeled "a1" and the port labeled "b2" of the device transmission line labeled "T" is "st21". When arrows are shown external to a device, either the multiplication factor is directly indicated, or is assumed to be unity if not indicated. For single port devices, "Γ" replaces "s" and the port numbers are excluded. For example, FIG. 3, the implied s parameter between the port labeled "a1" and the port labeled "b1" of the load labeled "L" is "Γ/". s parameters are frequency dependent parameters.

In these and subsequent descriptions, signal flow diagrams, such as FIG. 3, are said to represent a circuit topology in the sense that they show circuit elements and their connections. The points of connection are called nodes and are generally labeled. As mentioned, pairs of nodes form voltages (with a multiplicative constant of the square root of the reference impedance). These are called node voltages and are referenced to ground. Pairs of node voltages form differential node voltages (through subtraction) or common mode node voltages (through averaging). The associated nodes that form differential and common mode voltages are apparent through labeling. For example, a set of nodes labeled tlpa, tlpb, tlma, tlmb would form node voltages Vtlp and Vtlm (for the plus and minus voltages referenced to ground, respectively). If the differential voltage was the voltage of interest, these might be further grouped to form the voltage Vtl, where the differential nature is implied, but will be understood from the context.

The s parameter measurements of the circuit elements describe input and output characteristics of the elements. The circuit topology (including node connections) along with the measurements of the input and output characteristics of the circuit elements (including the probes and the scope channels) form a circuit model.

In accordance with the present invention, at the time of probe manufacture, the parameters are measured for the various portions of the probe independently. These portions generally include the tip, the body and the cable to the scope. These are all measured and stored in a machine readable form that is linked in some manner to the part itself. Usually, this is done by placing the s parameters in nonvolatile memory inside the part itself. The same is done for the scope at the time of its manufacture, specifically the reflection coefficient of the scope input channel. At the time that the probe is connected to the scope, the scope obtains all of these s parameters and builds conceptually a signal flow graph as shown in FIG. 4. In FIG. 4, the probe is shown as a probe tip [18], labeled "I", a probe body [19], labeled "B" and the probe cable and connection to the scope [20], labeled "O". FIG. 4 asserts the following relationships:

$$\begin{bmatrix} spi11 & spi12 \\ spi21 & spi22 \end{bmatrix} \cdot \begin{bmatrix} pia \\ pbb \end{bmatrix} = \begin{bmatrix} pib \\ pba \end{bmatrix} \quad \text{Equation 1}$$

$$\begin{bmatrix} spb11 & spb12 \\ spb21 & spb22 \end{bmatrix} \cdot \begin{bmatrix} pba \\ pob \end{bmatrix} = \begin{bmatrix} pbb \\ poa \end{bmatrix} \quad \text{Equation 2}$$

$$\begin{bmatrix} spo11 & spo12 \\ spo21 & spo22 \end{bmatrix} \cdot \begin{bmatrix} poa \\ scb \end{bmatrix} = \begin{bmatrix} pob \\ sca \end{bmatrix} \quad \text{Equation 3}$$

Equation 1, Equation 2 and Equation 3 leads to the following equation:

$$\begin{bmatrix} 1 & 0 & 0 & 0 & 0 & 0 & 0 & 0 \\ -spi11 & 1 & 0 & -spi12 & 0 & 0 & 0 & 0 \\ -spi21 & 0 & 1 & -spi22 & 0 & 0 & 0 & 0 \\ 0 & 0 & -spb11 & 1 & 0 & -spb12 & 0 & 0 \\ 0 & 0 & -spb21 & 0 & 1 & -spb21 & 0 & 0 \\ 0 & 0 & 0 & 0 & -spo11 & 1 & 0 & -spo12 \\ 0 & 0 & 0 & 0 & -spo21 & 0 & 1 & -spo22 \\ 0 & 0 & 0 & 0 & 0 & 0 & 0 & 1 \end{bmatrix} \cdot \begin{bmatrix} pia \\ pib \\ pba \\ pbb \\ poa \\ pob \\ sca \\ scb \end{bmatrix} = \begin{bmatrix} bsi \\ 0 \\ 0 \\ 0 \\ 0 \\ 0 \\ 0 \\ bso \end{bmatrix} \quad \text{Equation 4}$$

The solution to Equation 4 is given by:

$$\begin{bmatrix} pia \\ pib \\ pba \\ pbb \\ poa \\ pob \\ sca \\ scb \end{bmatrix} = \quad \text{Equation 5}$$

-continued $$\begin{bmatrix} 1 & 0 & 0 & 0 & 0 & 0 & 0 & 0 \\ -spi11 & 1 & 0 & -spi12 & 0 & 0 & 0 & 0 \\ -spi21 & 0 & 1 & -spi22 & 0 & 0 & 0 & 0 \\ 0 & 0 & -spb11 & 1 & 0 & -spb12 & 0 & 0 \\ 0 & 0 & -spb21 & 0 & 1 & -spb21 & 0 & 0 \\ 0 & 0 & 0 & 0 & -spo11 & 1 & 0 & -spo12 \\ 0 & 0 & 0 & 0 & -spo21 & 0 & 1 & -spo22 \\ 0 & 0 & 0 & 0 & 0 & 0 & 0 & 1 \end{bmatrix}^{-1} \begin{bmatrix} bsi \\ 0 \\ 0 \\ 0 \\ 0 \\ 0 \\ 0 \\ bso \end{bmatrix}$$

Equation 5 allows for the solution of an equivalent set of s parameters for the probe given by:

$$\begin{bmatrix} sp11 & sp12 \\ sp21 & sp22 \end{bmatrix} \cdot \begin{bmatrix} pia \\ scb \end{bmatrix} = \begin{bmatrix} pib \\ sca \end{bmatrix} \quad \text{Equation 6}$$

The s parameters in Equation 6 are solved utilizing Equation 5:

$$\begin{bmatrix} sp11 & sp12 \\ sp21 & sp22 \end{bmatrix} = \begin{bmatrix} \frac{pib}{pia}\big|_{bso=0} & \frac{pib}{scb}\big|_{bsi=0} \\ \frac{sca}{pia}\big|_{bso=0} & \frac{sca}{scb}\big|_{bsi=0} \end{bmatrix} \quad \text{Equation 7}$$

FIG. 5 shows the signal flow diagram representing FIG. 2. FIG. 5 assumes that the system s parameters are provided. As mentioned, these were measured on the circuit. Generally, the capability will exist to measure the entire transmission line in the circuit, but simulation and calculation are often necessary to separate the transmission line such that it can be represented by two separate sets of s parameters representing the left portion and right portion relative to the anticipated probing point. In other words, the left portion of the transmission line [21] in cascade with the right portion [22] is equivalent to the entire transmission line [14]. Given the probe s parameters calculated in Equation 7 as $$\begin{bmatrix} sp11 & sp12 \\ sp21 & sp22 \end{bmatrix}$$

corresponding to the probe [24], the reflection coefficient of the scope Fsc calibrated and stored in the scope corresponding to the scope input [25], the reflection coefficients $$\begin{bmatrix} stl11 & stl12 \\ stl21 & stl22 \end{bmatrix} \text{ and } \begin{bmatrix} str11 & str12 \\ str21 & str22 \end{bmatrix}$$

corresponding to the left portion [21] and the right portion [22] of the transmission line [14], the source reflection coefficient Γs corresponding to the source [15], the load reflection coefficient Γl corresponding to the load [16] and the known s parameters of a tee [23] which are $$\begin{bmatrix} -\frac{1}{3} & \frac{2}{3} & \frac{2}{3} \\ \frac{2}{3} & -\frac{1}{3} & \frac{2}{3} \\ \frac{2}{3} & \frac{2}{3} & -\frac{1}{3} \end{bmatrix}$$

(independent of the reference impedance), the signal flow diagram shown in FIG. 5 is constructed. The flow graph in FIG. 5 dictates the following set of relationships:

$$\begin{bmatrix} stl11 & stl12 \\ stl21 & stl22 \end{bmatrix} \cdot \begin{bmatrix} sa \\ tlb \end{bmatrix} = \begin{bmatrix} sb \\ tla \end{bmatrix} \quad \text{Equation 8}$$

$$\begin{bmatrix} str11 & str12 \\ str21 & str22 \end{bmatrix} \cdot \begin{bmatrix} tra \\ lb \end{bmatrix} = \begin{bmatrix} la \\ trb \end{bmatrix} \quad \text{Equation 9}$$

$$\begin{bmatrix} sp11 & sp12 \\ sp21 & sp22 \end{bmatrix} \cdot \begin{bmatrix} pia \\ scb \end{bmatrix} = \begin{bmatrix} pib \\ sca \end{bmatrix} \quad \text{Equation 10}$$

$$\begin{bmatrix} -\frac{1}{3} & \frac{2}{3} & \frac{2}{3} \\ \frac{2}{3} & -\frac{1}{3} & \frac{2}{3} \\ \frac{2}{3} & \frac{2}{3} & -\frac{1}{3} \end{bmatrix} \cdot \begin{bmatrix} tla \\ trb \\ pib \end{bmatrix} = \begin{bmatrix} tlb \\ tra \\ pia \end{bmatrix} \quad \text{Equation 11}$$

$$bs + \Gamma s \cdot sb = sa \quad \text{Equation 12}$$

Equation 8, Equation 9, Equation 10, Equation 11 and Equation 12 lead to the following equation:

$$\begin{bmatrix} 1 & -\Gamma s & 0 & 0 & 0 & 0 & 0 & 0 & 0 & 0 & 0 & 0 \\ -stl11 & 1 & 0 & -stl12 & 0 & 0 & 0 & 0 & 0 & 0 & 0 & 0 \\ -stl21 & 0 & 1 & -stl22 & 0 & 0 & 0 & 0 & 0 & 0 & 0 & 0 \\ 0 & 0 & \frac{1}{3} & 1 & 0 & -\frac{2}{3} & 0 & 0 & -\frac{2}{3} & 0 & 0 & 0 \\ 0 & 0 & -\frac{2}{3} & 0 & 1 & \frac{1}{3} & 0 & 0 & -\frac{2}{3} & 0 & 0 & 0 \\ 0 & 0 & 0 & 0 & -str11 & 1 & 0 & -str12 & 0 & 0 & 0 & 0 \\ 0 & 0 & 0 & 0 & -str21 & 0 & 1 & -str22 & 0 & 0 & 0 & 0 \\ 0 & 0 & 0 & 0 & 0 & 0 & -\Gamma l & 1 & 0 & 0 & 0 & 0 \\ 0 & 0 & -\frac{2}{3} & 0 & 0 & -\frac{2}{3} & 0 & 0 & 1 & \frac{1}{3} & 0 & 0 \\ 0 & 0 & 0 & 0 & 0 & 0 & 0 & 0 & -sp11 & 1 & 0 & -sp12 \\ 0 & 0 & 0 & 0 & 0 & 0 & 0 & 0 & -sp21 & 0 & 1 & -sp22 \\ 0 & 0 & 0 & 0 & 0 & 0 & 0 & 0 & 0 & 0 & -\Gamma sc & 1 \end{bmatrix} \cdot \begin{bmatrix} sa \\ sb \\ tla \\ tlb \\ tra \\ trb \\ la \\ lb \\ pia \\ pib \\ sca \\ scb \end{bmatrix} = \begin{bmatrix} bs \\ 0 \\ 0 \\ 0 \\ 0 \\ 0 \\ 0 \\ 0 \\ 0 \\ 0 \\ 0 \\ 0 \end{bmatrix} \quad \text{Equation 13}$$

Equation 13 can be solved as:

$$\begin{bmatrix} 1 & -\Gamma s & 0 & 0 & 0 & 0 & 0 & 0 & 0 & 0 & 0 & 0 \\ -stl11 & 1 & 0 & -stl12 & 0 & 0 & 0 & 0 & 0 & 0 & 0 & 0 \\ -stl21 & 0 & 1 & -stl22 & 0 & 0 & 0 & 0 & 0 & 0 & 0 & 0 \\ 0 & 0 & \frac{1}{3} & 1 & 0 & -\frac{2}{3} & 0 & 0 & 0 & -\frac{2}{3} & 0 & 0 \\ 0 & 0 & -\frac{2}{3} & 0 & 1 & \frac{1}{3} & 0 & 0 & 0 & -\frac{2}{3} & 0 & 0 \\ 0 & 0 & 0 & 0 & -str11 & 1 & 0 & -str12 & 0 & 0 & 0 & 0 \\ 0 & 0 & 0 & 0 & -str21 & 0 & 1 & -str22 & 0 & 0 & 0 & 0 \\ 0 & 0 & 0 & 0 & 0 & 0 & -\Gamma l & 1 & 0 & 0 & 0 & 0 \\ 0 & 0 & -\frac{2}{3} & 0 & 0 & -\frac{2}{3} & 0 & 0 & 1 & \frac{1}{3} & 0 & 0 \\ 0 & 0 & 0 & 0 & 0 & 0 & 0 & 0 & -sp11 & 1 & 0 & -sp12 \\ 0 & 0 & 0 & 0 & 0 & 0 & 0 & 0 & -sp21 & 0 & 1 & -sp22 \\ 0 & 0 & 0 & 0 & 0 & 0 & 0 & 0 & 0 & 0 & -\Gamma sc & 1 \end{bmatrix}^{-1} \cdot \begin{bmatrix} bs \\ 0 \\ 0 \\ 0 \\ 0 \\ 0 \\ 0 \\ 0 \\ 0 \\ 0 \\ 0 \\ 0 \end{bmatrix} = \begin{bmatrix} sa \\ sb \\ tla \\ tlb \\ tra \\ trb \\ la \\ lb \\ pia \\ pib \\ sca \\ scb \end{bmatrix}$$

Equation 14

Equation 14 provides the solution for all of the waves propagating in the circuit with respect to bs which is defined as:

$$bs = \frac{Vg \cdot Z_0}{Zs + Z_0}$$

Equation 15

Zs (the source impedance [2]) is related to the source reflection coefficient as:

$$\Gamma s = \frac{Zs - Z_0}{Zs + Z_0}$$

Equation 16 bs is dependent, therefore, on the voltage Vg of the voltage source [1] which is unknown.

Equation 17 shows the relationship of the waves determined by Equation 14 to the actual voltages present in the circuit:

$$\begin{bmatrix} 1 & 1 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 \\ 0 & 0 & 0 & 0 & 1 & 1 & 0 & 0 & 0 & 0 & 0 & 0 \\ 0 & 0 & 0 & 0 & 0 & 0 & 1 & 1 & 0 & 0 & 0 & 0 \\ 0 & 0 & 0 & 0 & 0 & 0 & 0 & 0 & 1 & 1 & 0 & 0 \\ 0 & 0 & 0 & 0 & 0 & 0 & 0 & 0 & 0 & 0 & 1 & 1 \end{bmatrix} \cdot \sqrt{Z_0} \cdot \begin{bmatrix} sa \\ sb \\ tla \\ tlb \\ tra \\ trb \\ la \\ lb \\ pia \\ pib \\ sca \\ scb \end{bmatrix} = \begin{bmatrix} Vs \\ Vtl \\ Vtr \\ Vl \\ Vpi \\ Vsc \end{bmatrix}$$

Equation 17

Equation 17, therefore, provides the voltages at all nodes of the circuit as a function of bs or using Equation 15, as a function of Vg. In accordance with the present method, the goal is to determine the voltage relationships not the actual voltages themselves specifically, the relationship of all of the voltages present in the circuit with respect to the voltage present at the scope input. All relationships are generated by solving Equation 17 for an arbitrary (non-zero) bs and simply dividing by Vsc:

$$\begin{bmatrix} Hs \\ Htl \\ Htr \\ Hl \\ Hpi \\ Hsc \end{bmatrix} = \begin{bmatrix} Vs \\ Vtl \\ Vtr \\ Vl \\ Vpi \\ Vsc \end{bmatrix} \cdot \frac{1}{Vsc}$$

Equation 18

The transfer functions solved in Equation 9 show the functions that convert the voltage measured at the scope input to the voltage measured at the desired node.

The transfer functions provided by Equation 18 are useful for calculating the voltage actually present at a circuit node due the voltage measured by the scope when the probe is connected to the circuit. In many cases, it is desirable to infer the voltage present at a node due to the voltage measured by the scope were the probe not connected to the circuit. This is calculated by considering the flow diagram in FIG. 6. It is clear that the voltages present at each node are:

$$\begin{bmatrix} 1 & 1 & 0 & 0 & 0 & 0 \\ 0 & 0 & 1 & 1 & 0 & 0 \\ 0 & 0 & 0 & 0 & 1 & 1 \end{bmatrix} \cdot \sqrt{Z_0} \cdot$$

$$\begin{bmatrix} 1 & -\Gamma s & 0 & 0 & 0 & 0 \\ -stl11 & 1 & 0 & -stl12 & 0 & 0 \\ -stl21 & 0 & 1 & -stl22 & 0 & 0 \\ 0 & 0 & -str11 & 1 & 0 & -str12 \\ 0 & 0 & -str21 & 0 & 1 & -str22 \\ 0 & -\Gamma s & 0 & 0 & 0 & 1 \end{bmatrix}^{-1} \cdot \begin{bmatrix} bs \\ 0 \\ 0 \\ 0 \\ 0 \\ 0 \end{bmatrix} = \begin{bmatrix} Vs' \\ Vt' \\ Vl' \end{bmatrix}$$

Equation 19

The transfer function that generates the voltages at circuit nodes with respect the voltage at the scope channel input is given by:

$$\begin{bmatrix} Hs' \\ Hl' \\ Ht' \end{bmatrix} = \begin{bmatrix} Vs' \\ Vl' \\ Vl' \end{bmatrix} \cdot \frac{1}{Vsc} \quad \text{Equation 20}$$

Equation 18 is utilized to generate transfer functions for the display of waveforms that would have been present at the circuit nodes if the probe was not connected to the circuit.

s parameters have been shown as one number for a source or load and as four numbers for a two port device. Actually, as is well known, this representation refers to a single frequency only. In other words, each transfer characteristic element solved for in Equation 18 as shown is a single complex number pertaining to a single frequency. In practice, s parameters are provided for a multitude of frequencies in order to characterize a device. Given s parameters for a given set of frequencies, Equation 18 and/or Equation 20 must be solved for each frequency.

It is advantageous to utilize the solutions to Equation 18 and Equation 20 to build digital filters to be utilized by the oscilloscope to transform the digitized waveform into the waveform pertaining to a given node. While there are many ways to do this, one method will now be described in greater detail.

Given, in accordance with the present method, a transfer function vector H (which represents an arbitrary one of the transfer functions calculated in Equation 18 and Equation 20) consisting of a vector of complex numbers (i.e. the equations were solved for a multitude of frequencies). The vector is length N+1, whereby each element in the vector $H_n$, n∈[0,N] represents the desired response of the filter to a frequency $$f_n = \frac{n}{N} \cdot F_e.$$

$F_e$ is the last frequency in the vector. In order to generate this response vector, the s parameters provided have been measured or calculated at all of these frequencies.

Before continuing, it is useful to point out some implications of this vector that should be considered in order to generate a useful filter.

First, the vector assumes an equal spacing in frequency from DC to $F_e$. It is not always possible to meet these conditions utilizing measurements from a VNA. Usually, the VNA will not generate s parameters for DC. This is easily handled by utilizing the magnitude of the s parameter very close to DC as the DC value or by extrapolation, simulation or calculation.

Second, the selection of the frequency $F_e$ should be such that it extends out to the frequencies of interest possible, either to the frequency extent that the circuit can permit or to the frequency extent of the signals being applied.

Thirdly, if equal spacing of frequencies is not possible, interpolation will be necessary to generate intermediate points. Interpolation is a well known technique, but care will be required in that the unwrapped phase needs to be considered in any interpolation. Modern VNAs can be configured to avoid this complexity.

Fourthly, the number of frequency points N+1 coupled with the end frequency $F_e$ determines the frequency resolution $F_e/N$. The frequency resolution determines not only the accuracy to which the finite data points represent the system, but very importantly, the time duration of the filter. The time duration will be the reciprocal of the frequency resolution (i.e. $N/F_e$) and clearly must represent a time sufficient for handling all of the signal propagation times in the system. The time duration required will depend on the nature of the circuit, such as the transmission line lengths involved and the degree of impedance mismatch at various circuit points. Time durations of five and ten times the electrical length of the longest transmission line might be required.

Fifthly, The vector H was calculated by dividing voltages—a voltage present in the circuit by a voltage present at the scope input. It is clear that if the voltage present at the scope input at a given frequency is zero, then $H_n$ will be infinite at that point. This can occur in pathological cases such as open or shorted transmission line stubs in the circuit, or in situations where the probe has bandwidth insufficient to infer high frequency signals present in the circuit. In such a situation, $F_e$ must be chosen to avoid this situation, or a probe with sufficient bandwidth must be utilized. If, as often is the case, the combination of the scope and probe bandwidth is insufficient to match the potential frequency content in the system, the filter responses must be rolled off by multiplication by a filter function, for example. In this situation, the result of the probe compensation will be such that it will produce a substantially correct version of the waveform present at a circuit node within the bandwidth constraints of the probe and the scope. This is often not a serious limitation in that all measurements made are substantially correct to this extent.

Finally, the transfer function of the desired filter will often require future values of the input sequence. This is caused by the fact that that the signal arriving at the scope input is delayed by the probe and its cable and therefore signals occurring inside the circuit often occur earlier in time than the signals digitized. This is not a problem if handled properly and can be handled in many ways. The simplest way to handle this is to prepare the frequency response so that it reflects the response to a time delayed impulse. This is done by selecting a delay time and then remembering this delay and accounting for it in the time placement of the sampled and filtered waveform.

a. With the aforementioned considerations taken into account, the vector needs to be prepared for use with an inverse discrete Fourier transform (IDFT). This is done by treating the vector as follows:

First, apply the delay:

$$H_n \to H_n \cdot e^{-j \cdot 2 \cdot \pi \cdot f_n \cdot D} \quad \text{Equation 21}$$

Remember that this will result in a delay time of D that must be accounted for by advancing the final, filtered waveform.

Next, define the elements i∈[1,N−1], $H_{N+i} = \overline{H_{N-i}}$. This is the mirroring of the complex conjugate of the response about $F_e$. Set $H_N = |H_N|$. The new vector is K=2·N elements long.

Next, apply a scaling factor to make the IDFT work properly:

$$H_n \to \frac{1}{K} \cdot H_n \quad \text{Equation 22}$$

Finally, Calculate the IDFT as:

$$h_k = \sum_{n=0}^{K-1} H_n \cdot e^{j \cdot 2\pi \cdot \frac{n \cdot k}{K}}, k \in [0, K-1]$$

Equation 23

Definition of the *IDFT*

This is the impulse response of a filter that can be utilized directly at a sample rate of Fs=2·Fe:

$$y_k = \sum_{\sigma=0}^{K-1} x_{k-\sigma} \cdot h_\sigma$$

Equation 24

Oftentimes, the filter calculated in this manner will not be at the desired sample rate of the system. To account for this, it is converted to the appropriate sample rate through interpolation of the time domain response. An easier, alternative method is to utilize the Chirp Z Transform (CZT) to make the conversion.

$$CZT_m = \frac{1}{K} \cdot \sum_{k=0}^{K-1} x_k \cdot [A_0 \cdot e^{j \cdot 2\pi \cdot \theta_0} \cdot (W_0 \cdot e^{j \cdot 2\pi \cdot \phi_0})^m]^{-k}$$

Equation 25 definition of the Chirp Z Transform

Equation 25 is utilized to generate the Z transform along an arc in the Z domain. It is used here to generate the Z transform along equi-angularly spaced points along the unit circle (but not the spacing implied by the discrete Fourier transform (DFT)). The goal is to create a filter of L points suitable for use at a sample rate of Fs'. The frequency points are defined for the CZT as M+1 points, where M=L/2, $\theta_0=0$, $A_0=1$, $W_0=1$, and $$\phi_0 = \frac{Fs'}{Fs} \cdot \frac{1}{L}.$$

Since the arc is not entirely arbitrary as the CZT allows, Equation 25 becomes:

$$H_m = \frac{1}{L} \cdot \sum_{k=0}^{K-1} h_k \cdot e^{-j \cdot 2\pi \frac{m \cdot k}{L} \cdot \frac{Fs'}{Fs}}, m \in [0, M]$$

Equation 26

It is illustrative to note that were Fs'=Fs and were L=K, Equation 26 would become simply the DFT:

$$H_n = \frac{1}{K} \cdot \sum_{k=0}^{K-1} h_k \cdot e^{-j \cdot 2\pi \frac{n \cdot k}{K}}$$

Equation 27

Definition of the *DFT*

The frequency of each point in the CZT is:

$$f'_m = \frac{m}{M} \cdot \frac{Fs'}{2},$$

Equation 28

With the determination of the vector H from Equation 26, all that remains is to calculate the filter by computing the inverse DFT.

First, handle the case where the desired sample rate of the final filter may be higher than the sample rate of the current filter (i.e. Fs'>Fs). If this is the case, there will be unwanted images that must be removed:

$$H_m = \begin{bmatrix} H_m & \text{if } f'_m \leq \frac{Fs}{2} \\ 0 & \text{otherwise} \end{bmatrix}$$

Equation 29

Next, define the elements m'∈[1,M−1], $H_{M+m'} = \overline{H_{m-m'}}$. Set $H_M = |H_M|$. The new vector is L=2·M elements long.

Finally, Calculate the IDFT as:

$$h'_l = \sum_{m=0}^{L-1} H_m \cdot e^{j \cdot 2\pi \cdot \frac{m \cdot l}{L}}, l \in [0, L-1]$$

Equation 30

The resulting filter is a filter that can be utilized at the sample rate $F_s'$ as:

$$y_k = \sum_{\sigma=0}^{L-1} x_{k-\sigma} \cdot h'_\sigma$$

Equation 31

The filter in Equation 31 is used to convert the digitized waveform x to a new digitized waveform y that is representative of the digitized waveform corresponding to the waveforms present at the nodes in FIG. 5 and FIG. 6 corresponding to the voltage relationships provided in Equation 17 and Equation 19.

Up to this point, only systems where the voltages are referenced to ground (i.e. single-ended systems) have been considered. A much more complicated, but increasingly more important situation is that of differential systems and differential probes.

FIG. 7 is illustrative of a differential system. FIG. 7 is analogous to FIG. 1, but is a differential case. FIG. 7 shows two voltage sources ([26] and [27]) with two source impedances ([28] and [29]) each driving a transmission line ([31] and [32]) that arrives at two loads ([34] and [35]). Note that there is also an impedance shown between the two sources [30] and between the two loads [36]. Usually, it is the intent of such a system to develop a differential voltage as measured between both driving points and to receive this difference at a receiver where the difference in voltage at the end of the transmission line is measured. Usually, it is the circuit designers' intent to drive the minus voltage with an equal and opposite voltage in time with the positive voltage. Such a situation is said to be balanced and in such a situation, there is only a differential mode component transmitted. In cases where the voltage is not balanced, there is said to be a common mode component of the voltage transmitted.

In some cases, the differential transmission line can be viewed as two independent transmission lines, but often (and in reality) they should be viewed as a coupled line. FIG. 7 shows a simplified view of the multiple coupling between the lines indicated by the center transmission line [33]—in reality the situation is more complicated that that shown since each transmission line shown also has a different propagation time.

The signal flow graph representation of FIG. 7 is shown in FIG. 9. FIG. 9 shows the differential source as two single-ended sources ([42] and [43]), a two-port model of the source impedance [44], a four-port model of the transmission line [45], and a two port model of the load [46].

The differential measurement situation is shown in FIG. 8. The probe is shown consisting of a pair of probe tips ([37] and [38]), a probe body [39], and a cable [40] driving a load that is the scope input channel [41]. As in the single-ended situation, the probe is shown breaking the differential transmission line into a left portion and a right portion, with the understanding that FIG. 8 is a simplistic graphical representation of a more complicated situation which will become clearer when the signal flow graphs are introduced.

In accordance with the present method, at the time of differential probe manufacture, the s parameters are measured for the various portions of the probe independently. These are all measured and stored in a machine readable form that is linked in some manner to the part itself. Usually, this is done by placing the s parameters in nonvolatile memory inside the part itself. The same is done for the scope at the time of its manufacture, specifically the reflection coefficient of the scope input channel. At the time that the probe is connected to the scope, the scope obtains all of these s parameters and builds conceptually a signal flow graph as shown in FIG. 10. The s parameters for the portions making up the probe are shown as the tips [47], the body [48] and the cable and connection to the scope [49]. Note that the probe tips [47] form a four-port device (because there are interactions between the tips) and the probe body [48], which contains a differential amplifier, is shown as a three-port device.

The flow graph in FIG. 10 indicates the following set of relationships:

$$\begin{bmatrix} spi11 & spi12 & spi13 & spi14 \\ spi21 & spi22 & spi23 & spi24 \\ spi31 & spi32 & spi33 & spi34 \\ spi41 & spi42 & spi43 & spi44 \end{bmatrix} \begin{bmatrix} pipa \\ pbpb \\ pima \\ pbmb \end{bmatrix} = \begin{bmatrix} pipb \\ pbpa \\ pimb \\ pbma \end{bmatrix} \quad \text{Equation 32}$$

$$\begin{bmatrix} spb11 & spb12 & spb13 \\ spb21 & spb22 & spb23 \\ spb31 & spb32 & spb33 \end{bmatrix} \cdot \begin{bmatrix} pbpa \\ pbma \\ pob \end{bmatrix} = \begin{bmatrix} pbpb \\ pbmb \\ poa \end{bmatrix} \quad \text{Equation 33}$$

$$\begin{bmatrix} spo11 & spo12 \\ spo21 & spo22 \end{bmatrix} \cdot \begin{bmatrix} poa \\ scb \end{bmatrix} = \begin{bmatrix} pob \\ sca \end{bmatrix} \quad \text{Equation 34}$$

Equation 32, Equation 33, and Equation 34 lead to the following equation:

$$\begin{bmatrix} 1 & 0 & 0 & 0 & 0 & 0 & 0 & 0 & 0 & 0 & 0 & 0 \\ -spi11 & 1 & 0 & -spi12 & -spi13 & 0 & 0 & -spi14 & 0 & 0 & 0 & 0 \\ -spi21 & 0 & 1 & -spi22 & -spi23 & 0 & 0 & -spi24 & 0 & 0 & 0 & 0 \\ 0 & 0 & -spb11 & 1 & 0 & 0 & -spb12 & 0 & 0 & -spb13 & 0 & 0 \\ 0 & 0 & 0 & 0 & 1 & 0 & 0 & 0 & 0 & 0 & 0 & 0 \\ -spi31 & 0 & 0 & -spi32 & -spi33 & 1 & 0 & -spi34 & 0 & 0 & 0 & 0 \\ -spi41 & 0 & 0 & -spi42 & -spi43 & 0 & 1 & -spi44 & 0 & 0 & 0 & 0 \\ 0 & 0 & -spb21 & 0 & 0 & 0 & -spb22 & 1 & 0 & -spb23 & 0 & 0 \\ 0 & 0 & -spb31 & 0 & 0 & 0 & -spb32 & 0 & 1 & -spb33 & 0 & 0 \\ 0 & 0 & 0 & 0 & 0 & 0 & 0 & -spo11 & 1 & 0 & -spo12 \\ 0 & 0 & 0 & 0 & 0 & 0 & 0 & -spo21 & 0 & 1 & -spo22 \\ 0 & 0 & 0 & 0 & 0 & 0 & 0 & 0 & 0 & 0 & 1 \end{bmatrix} \cdot \begin{bmatrix} pipa \\ pipb \\ pbpa \\ pbpb \\ pima \\ pimb \\ pbma \\ pbmb \\ poa \\ pob \\ sca \\ scb \end{bmatrix} = \begin{bmatrix} bspi \\ 0 \\ 0 \\ 0 \\ bsmi \\ 0 \\ 0 \\ 0 \\ 0 \\ 0 \\ 0 \\ bso \end{bmatrix} \quad \text{Equation 35}$$

The solution to Equation 35 is given by:

$$\begin{bmatrix} pipa \\ pipb \\ pbpa \\ pbpb \\ pima \\ pimb \\ pbma \\ pbmb \\ poa \\ pob \\ sca \\ scb \end{bmatrix} = \begin{bmatrix} 1 & 0 & 0 & 0 & 0 & 0 & 0 & 0 & 0 & 0 & 0 & 0 \\ -spi11 & 1 & 0 & -spi12 & -spi13 & 0 & 0 & -spi14 & 0 & 0 & 0 & 0 \\ -spi21 & 0 & 1 & -spi22 & -spi23 & 0 & 0 & -spi24 & 0 & 0 & 0 & 0 \\ 0 & 0 & -spb11 & 1 & 1 & 0 & -spb12 & 0 & 0 & -spb13 & 0 & 0 \\ 0 & 0 & 0 & 0 & 0 & 0 & 0 & 0 & 0 & 0 & 0 & 0 \\ -spi31 & 0 & 0 & -spi32 & -spi32 & 1 & 0 & -spi34 & 0 & 0 & 0 & 0 \\ -spi41 & 0 & 0 & -spi42 & -spi42 & 0 & 1 & -spi44 & 0 & 0 & 0 & 0 \\ 0 & 0 & -spb21 & 0 & 0 & 0 & -spb22 & 1 & 0 & -spb23 & 0 & 0 \\ 0 & 0 & -spb31 & 0 & 0 & 0 & -spb32 & 0 & 1 & -spb33 & 0 & 0 \\ 0 & 0 & 0 & 0 & 0 & 0 & 0 & -spo11 & 1 & 0 & -spo12 \\ 0 & 0 & 0 & 0 & 0 & 0 & 0 & -spo21 & 0 & 1 & -spo22 \\ 0 & 0 & 0 & 0 & 0 & 0 & 0 & 0 & 0 & 0 & 1 \end{bmatrix}^{-1} \cdot \begin{bmatrix} bspi \\ 0 \\ 0 \\ 0 \\ bsmi \\ 0 \\ 0 \\ 0 \\ 0 \\ 0 \\ 0 \\ bso \end{bmatrix} \quad \text{Equation 36}$$

Equation 36 allows for the solution of an equivalent set of s parameters for the probe given by:

$$\begin{bmatrix} sp11 & sp12 & sp13 \\ sp21 & sp22 & sp23 \\ sp31 & sp32 & sp33 \end{bmatrix} \cdot \begin{bmatrix} pipa \\ pima \\ scb \end{bmatrix} = \begin{bmatrix} pipb \\ pimb \\ sca \end{bmatrix} \quad \text{Equation 37}$$

The s parameters in Equation 37 are solved utilizing Equation 36:

$$\begin{bmatrix} sp11 & sp12 & sp13 \\ sp21 & sp22 & sp23 \\ sp31 & sp32 & sp33 \end{bmatrix} = \quad \text{Equation 38}$$

$$\begin{bmatrix} \frac{pipb}{pipa}\Big|_{bso=0}^{bsmi=0} & \frac{pipb}{pima}\Big|_{bso=0}^{bspi=0} & \frac{pipb}{scb}\Big|_{bsmi=0}^{bspi=0} \\ \frac{pimb}{pipa}\Big|_{bso=0}^{bsmi=0} & \frac{pimb}{pima}\Big|_{bso=0}^{bspi=0} & \frac{pimb}{scb}\Big|_{bsmi=0}^{bspi=0} \\ \frac{sca}{pipa}\Big|_{bso=0}^{bsmi=0} & \frac{sca}{pima}\Big|_{bso=0}^{bspi=0} & \frac{sca}{scb}\Big|_{bsmi=0}^{bspi=0} \end{bmatrix}$$

When a measurement is to be performed, s parameter measurements of the circuit are provided. Given the probe s parameters corresponding to the probe [54] calculated in Equation 38 as $$\begin{bmatrix} sp11 & sp12 & sp13 \\ sp21 & sp22 & sp23 \\ sp31 & sp32 & sp33 \end{bmatrix},$$

the reflection coefficient $\Gamma sc$ that represents the scope input [55], the s parameters $$\begin{bmatrix} stl11 & stl12 & stl13 & stl14 \\ stl21 & stl22 & stl23 & stl24 \\ stl31 & stl32 & stl33 & stl34 \\ stl41 & stl42 & stl43 & stl44 \end{bmatrix} \text{ and } \begin{bmatrix} str11 & str12 & str13 & str14 \\ str21 & str22 & str23 & str24 \\ str31 & str32 & str33 & str34 \\ str41 & str42 & str43 & str44 \end{bmatrix}$$

that represent the left portion [50] and right portion [51] of the transmission line [45], the s parameters $$\begin{bmatrix} ss11 & ss12 \\ ss21 & ss22 \end{bmatrix}$$

that represent the source impedance [44], the s parameters $$\begin{bmatrix} sl11 & sl12 \\ sl21 & sl22 \end{bmatrix}$$

that represent the load [46] and the known s parameters of a tee that represent the positive probe tip connection point [52] and the negative probe tip connection point [53], the signal flow diagram shown in FIG. 11 is constructed. FIG. 11 shows the signal flow diagram representing FIG. 8. Unlike FIG. 8, which is a simplified graphical view of the situation, FIG. 11 is not simplified inasmuch as it considers four port models of the transmission line and two port models load and source impedance without any other simplifying assumptions.

The flow graph in FIG. 11 dictates the following set of relationships:

$$\begin{bmatrix} stl11 & stl12 & stl13 & stl14 \\ stl21 & stl22 & stl23 & stl24 \\ stl31 & stl32 & stl33 & stl34 \\ stl41 & stl42 & stl43 & stl44 \end{bmatrix} \cdot \begin{bmatrix} spa \\ tipb \\ sma \\ tlmb \end{bmatrix} = \begin{bmatrix} spb \\ tlpa \\ smb \\ tlma \end{bmatrix} \quad \text{Equation 39}$$

$$\begin{bmatrix} str11 & str12 & str13 & str14 \\ str21 & str22 & str23 & str24 \\ str31 & str32 & str33 & str34 \\ str41 & str42 & str43 & str44 \end{bmatrix} \cdot \begin{bmatrix} trpa \\ lpb \\ trma \\ lmb \end{bmatrix} = \begin{bmatrix} trpb \\ lpa \\ trmb \\ lma \end{bmatrix} \quad \text{Equation 40}$$

$$\begin{bmatrix} sp11 & sp12 & sp13 \\ sp21 & sp22 & sp23 \\ sp31 & sp32 & sp33 \end{bmatrix} \cdot \begin{bmatrix} pipa \\ pima \\ scb \end{bmatrix} = \begin{bmatrix} pipb \\ pimb \\ sca \end{bmatrix} \quad \text{Equation 41}$$

$$\begin{bmatrix} -\frac{1}{3} & \frac{2}{3} & \frac{2}{3} \\ \frac{2}{3} & -\frac{1}{3} & \frac{2}{3} \\ \frac{2}{3} & \frac{2}{3} & -\frac{1}{3} \end{bmatrix} \cdot \begin{bmatrix} tlpa \\ trpb \\ pipb \end{bmatrix} = \begin{bmatrix} tlpb \\ trpa \\ pipa \end{bmatrix} \quad \text{Equation 42}$$

$$\begin{bmatrix} -\frac{1}{3} & \frac{2}{3} & \frac{2}{3} \\ \frac{2}{3} & -\frac{1}{3} & \frac{2}{3} \\ \frac{2}{3} & \frac{2}{3} & -\frac{1}{3} \end{bmatrix} \cdot \begin{bmatrix} tlma \\ trmb \\ pimb \end{bmatrix} = \begin{bmatrix} tlmb \\ tma \\ pima \end{bmatrix} \quad \text{Equation 43}$$

$$\begin{bmatrix} sl11 & sl12 \\ sl21 & sl22 \end{bmatrix} \cdot \begin{bmatrix} lpa \\ lma \end{bmatrix} = \begin{bmatrix} lbp \\ lmb \end{bmatrix} \quad \text{Equation 44}$$

$$\begin{bmatrix} ss11 & ss12 \\ ss21 & ss22 \end{bmatrix} \cdot \begin{bmatrix} spb \\ smb \end{bmatrix} + \begin{bmatrix} bsp \\ bsm \end{bmatrix} = \begin{bmatrix} spa \\ sma \end{bmatrix} \quad \text{Equation 45}$$

$$sca \cdot \Gamma sc = scb \quad \text{Equation 46}$$

Equation 39 through Equation 46 leads to the following equations:

Equation 47

$$S = \begin{bmatrix}
1 & -ss11 & 0 & 0 & 0 & -ss12 & 0 & 0 & 0 & 0 & 0 & 0 & 0 & 0 & 0 & 0 & 0 & 0 & 0 & 0 \\
-stl11 & 1 & 0 & -stl12 & -stl13 & 0 & -stl14 & 0 & 0 & 0 & 0 & 0 & 0 & 0 & 0 & 0 & 0 & 0 & 0 & 0 \\
-stl21 & 0 & 1 & -stl22 & -stl23 & 0 & -stl24 & 0 & 0 & 0 & 0 & 0 & 0 & 0 & 0 & 0 & 0 & 0 & 0 & 0 \\
0 & 0 & \tfrac{1}{3} & 1 & 0 & 0 & 0 & 0 & 0 & -2/3 & 0 & 0 & 0 & 0 & 0 & 0 & 0 & 0 & 0 & 0 \\
0 & -ss21 & 0 & 0 & 1 & -ss22 & 0 & 0 & 0 & 0 & 0 & 0 & 0 & 0 & 0 & 0 & 0 & 0 & 0 & 0 \\
-stl31 & 0 & 0 & -stl32 & -stl33 & 1 & -stl34 & 0 & 0 & 0 & 0 & 0 & 0 & 0 & 0 & 0 & 0 & 0 & 0 & 0 \\
-stl41 & 0 & 0 & -stl42 & -stl43 & 0 & -stl44 & 1 & 0 & 0 & 0 & 0 & 0 & 0 & 0 & 0 & 0 & 0 & 0 & 0 \\
0 & 0 & -2/3 & 0 & 0 & 0 & 0 & 1 & 1 & 0 & 0 & 0 & 0 & 0 & 0 & 0 & 0 & 0 & 0 & 0 \\
0 & 0 & 0 & 0 & 0 & 0 & 0 & -str11 & 1 & 1/3 & -str12 & -str13 & 0 & -str14 & 0 & 0 & 0 & 0 & 0 & 0 \\
0 & 0 & 0 & 0 & 0 & 0 & 0 & -str21 & 0 & 1 & -str22 & -str23 & 0 & -str24 & 0 & 0 & 0 & 0 & 0 & 0 \\
0 & 0 & 0 & 0 & 0 & 0 & 0 & 0 & 0 & -sl12 & 1 & 0 & 0 & 0 & 0 & 0 & 0 & 0 & 0 & 0 \\
0 & 0 & 0 & 0 & 0 & 0 & 0 & -str31 & 0 & \tfrac{1}{3} & -str32 & -str33 & 1 & -str34 & 0 & 0 & 0 & 0 & 0 & 0 \\
0 & 0 & 0 & 0 & 0 & 0 & 0 & -str41 & 0 & 0 & -str42 & -str43 & 0 & -str44 & 1 & 0 & 0 & 0 & 0 & 0 \\
0 & 0 & 0 & 0 & 0 & 0 & 0 & 0 & 0 & -sl21 & 0 & 0 & 0 & 0 & 1 & -sl22 & 0 & 0 & 0 & 0 \\
0 & 0 & -2/3 & 0 & 0 & 0 & 0 & 0 & 0 & 0 & 0 & 0 & 0 & 0 & 0 & 1 & -2/3 & 0 & 0 & 0 \\
0 & 0 & 0 & 0 & 0 & 0 & 0 & 0 & 0 & 0 & 0 & 0 & 0 & 0 & 0 & 1 & \tfrac{1}{3} & 0 & 0 & 0 \\
0 & 0 & 0 & 0 & 0 & 0 & 0 & 0 & 0 & 0 & 0 & 0 & 0 & 0 & 0 & -sp11 & 1 & -sp12 & -sp13 & 0 \\
0 & 0 & 0 & 0 & 0 & 0 & 0 & 0 & 0 & 0 & 0 & 0 & 0 & 0 & 0 & -sp21 & 0 & -sp22 & -sp23 & 1 \\
0 & 0 & 0 & 0 & 0 & 0 & 0 & 0 & 0 & 0 & 0 & 0 & 0 & 0 & 0 & -sp31 & -1/3 & -sp32 & -sp33 & 0 \\
0 & 0 & 0 & 0 & 0 & 0 & 0 & 0 & 0 & 0 & 0 & 0 & 0 & 0 & 0 & 0 & 0 & 0 & 1 & 1 \\
0 & 0 & 0 & 0 & 0 & 0 & 0 & 0 & 0 & 0 & 0 & 0 & 0 & 0 & 0 & 0 & 0 & 0 & -\Gamma_{sc} & 1
\end{bmatrix}$$

$$ab = \begin{bmatrix} spa \\ spb \\ tlpa \\ tlpb \\ sma \\ smb \\ tlma \\ tlmb \\ trpa \\ trpb \\ lpa \\ lpb \\ trma \\ trmb \\ lma \\ lmb \\ pipa \\ pipb \\ pima \\ pimb \\ sca \\ scb \end{bmatrix}$$

Equation 48

$$bs = \begin{bmatrix} bsp \\ 0 \\ 0 \\ 0 \\ bsm \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix}$$

Equation 49

$$V = \begin{bmatrix} Vs \\ Vtl \\ Vtr \\ Vl \\ Vpi \\ Vsc \end{bmatrix}$$

Equation 50

$$vd = \begin{bmatrix} 1 & 1 & 0 & 0 & -1 & -1 & 0 & 0 & 0 & 0 & 0 & 0 & 0 & 0 & 0 & 0 & 0 & 0 & 0 & 0 & 0 & 0 \\ 0 & 0 & 1 & 1 & 0 & 0 & -1 & -1 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 1 & 1 & 0 & 0 & -1 & -1 & 0 & 0 & 0 & 0 & 0 & 0 & 0 & 0 \\ 0 & 0 & 0 & 0 & 0 & 0 & 0 & 0 & 0 & 0 & 1 & 1 & 0 & 0 & -1 & -1 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 1 & 1 & -1 & -1 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 1 & 1 \end{bmatrix}$$

Equation 51

$$V = vd \cdot \sqrt{Z_0} \cdot S^{-1} \cdot bs$$

Equation 52

$$H = V \cdot \frac{1}{Vsc}$$

Equation 53

Similarly, the signal flow diagram in FIG. 12, which represents the unconnected probe case, dictates the following set of relationships:

$$\begin{bmatrix} stl11 & stl12 & stl13 & stl14 \\ stl21 & stl22 & stl23 & stl24 \\ stl31 & stl32 & stl33 & stl34 \\ stl41 & stl42 & stl43 & stl44 \end{bmatrix} \cdot \begin{bmatrix} spa \\ tpb \\ sma \\ tmb \end{bmatrix} = \begin{bmatrix} spb \\ tpa \\ smb \\ tma \end{bmatrix}$$

Equation 54

$$\begin{bmatrix} str11 & str12 & str13 & str14 \\ str21 & str22 & str23 & str24 \\ str31 & str32 & str33 & str34 \\ str41 & str42 & str43 & str44 \end{bmatrix} \cdot \begin{bmatrix} tpa \\ lpb \\ tma \\ lmb \end{bmatrix} = \begin{bmatrix} tpb \\ lpa \\ tmb \\ lma \end{bmatrix}$$

Equation 55

$$\begin{bmatrix} sl11 & sl12 \\ sl21 & sl22 \end{bmatrix} \cdot \begin{bmatrix} lpa \\ lma \end{bmatrix} = \begin{bmatrix} lpb \\ lmb \end{bmatrix}$$

Equation 56

$$\begin{bmatrix} ss11 & ss12 \\ ss21 & ss22 \end{bmatrix} \cdot \begin{bmatrix} spb \\ smb \end{bmatrix} + \begin{bmatrix} bsp \\ bsm \end{bmatrix} = \begin{bmatrix} spa \\ sma \end{bmatrix}$$

Equation 57

Equation 54 through Equation 57 lead to the following equations:

$$S' = \begin{bmatrix} 1 & -ss11 & 0 & -ss12 & 0 & 0 & 0 & 0 & 0 & 0 & 0 & 0 \\ -st11 & 1 & -st13 & 0 & 0 & -st12 & 0 & -st14 & 0 & 0 & 0 & 0 \\ 0 & -ss21 & 1 & -ss22 & 0 & 0 & 0 & 0 & 0 & 0 & 0 & 0 \\ -st31 & 0 & -st33 & 1 & 0 & -st32 & 0 & -st34 & 0 & 0 & 0 & 0 \\ -st21 & 0 & -st23 & 0 & 1 & -st22 & 0 & -st24 & 0 & 0 & 0 & 0 \\ 0 & 0 & 0 & 0 & -str11 & 1 & -str13 & 0 & 0 & -str12 & 0 & -str14 \\ -st41 & 0 & -st43 & 0 & 0 & -st42 & 1 & -st44 & 0 & 0 & 0 & 0 \\ 0 & 0 & 0 & 0 & -str31 & 0 & -str33 & 1 & 0 & -str32 & 0 & -str34 \\ 0 & 0 & 0 & 0 & -str21 & 0 & -str23 & 0 & 1 & -str22 & 0 & -str24 \\ 0 & 0 & 0 & 0 & 0 & 0 & 0 & 0 & -sl11 & 1 & -sl12 & 0 \\ 0 & 0 & 0 & 0 & -str41 & 0 & -str43 & 0 & 0 & -str42 & 1 & -str44 \\ 0 & 0 & 0 & 0 & 0 & 0 & 0 & 0 & -sl21 & 0 & -sl22 & 1 \end{bmatrix}$$

Equation 58

$$ab' = \begin{bmatrix} spa \\ spb \\ sma \\ smb \\ tpa \\ tpb \\ tma \\ tmb \\ lpa \\ lpb \\ lma \\ lmb \end{bmatrix}$$

Equation 59

$$bs' = \begin{bmatrix} bsp \\ 0 \\ bsm \\ 0 \\ 0 \\ 0 \\ 0 \\ 0 \\ 0 \\ 0 \\ 0 \\ 0 \end{bmatrix}$$

Equation 60

$$V' = \begin{bmatrix} Vs' \\ Vt' \\ Vl' \end{bmatrix}$$

Equation 61

$$vd' = \begin{bmatrix} 1 & 1 & -1 & -1 & 0 & 0 & 0 & 0 & 0 & 0 & 0 & 0 \\ 0 & 0 & 0 & 0 & 1 & 1 & -1 & -1 & 0 & 0 & 0 & 0 \\ 0 & 0 & 0 & 0 & 0 & 0 & 0 & 0 & 1 & 1 & -1 & -1 \end{bmatrix}$$

Equation 62

$$V' = vd' \cdot \sqrt{Z_0} \cdot S'^{-1} \cdot bs'$$

Equation 63

$$H' = V' \cdot \frac{1}{Vsc}$$

Equation 64

In order to generate the probe compensation filters, Equation 52 and Equation 63 are solved for the voltages present in the circuit due to bsp and bsm that make up bs (in Equation 49) and bs' (in Equation 60) and then the transfer function for all filters are calculated using Equation 53 and Equation 64.

The differential case has some particular details that must be handled specially. It is clear that a differential probe measures the voltage difference in a circuit, but the actual voltages present and indicated by the signal flow graph are in actuality referenced to ground. In other words, the differential voltage is the difference between two voltages that are in actuality referenced to ground. It is often useful to think of the voltages present in the circuit not as two single ended voltages, but instead as a voltage consisting of a differential and common-mode component. The intent of the probe is to measure the differential component and to reject the common-mode component. It is usually the circuit designer's intent to transmit a differential voltage and to not transmit any common-mode components, but unintentional common mode components will occur. In the solutions of the single-ended case, I used an arbitrary, non-zero value bs that was suitable for solving for the voltage relationships in the circuit and probe, but in the differential case, this is no longer possible since there are two different values bsm and bsp that contribute to the voltages present in the circuit. While either bsm or bsp can be chosen arbitrarily (non-zero), the relationship between them is not arbitrary and must be specified. There are a few ways to go about determining this relationship.

The first way is when the differential probe is being utilized in a single-ended measurement situation. This situation occurs when a differential probe is utilized with either of its two tips connected to ground. In this situation, its intent is to truly measure the voltage to ground. This situation is dealt with by simply setting bsm=0 or bsp=0, depending on which tip is connected to ground. Note that in this situation, the s parameters for the system would reflect the single ground referenced transmission line under test.

The second way is to assume balanced drive. In most cases, this is a good approximation of how the system is driven. In this case, set bsm=−bsp. The compensation filters will be valid only to the extent that the balanced drive condition is met. Its validity, however, will not depend on common mode components set up in the system due to mode conversion within the circuit under balanced drive conditions, because these are properly accounted for in the flow graph and equations.

Finally, the degree of balance can be measured. This is accomplished by taking measurements of the source driving a known load. This could be done, for example, by simply driving a differential step from the source and acquiring the plus and minus source step on an oscilloscope. A transfer function $H_{bsp \to bsm}(s)$ is thereby calculated that converts bsp to bsm. During the solution of the aforementioned equations, an arbitrary (non-zero) value would be chosen for bsp and bsm is chosen as:

$$bsm = bsp \cdot H_{bsp \to bam}(j \cdot 2 \cdot \pi \cdot f) \quad \text{Equation 65}$$

Equation 65 accounts for balance of frequency components, but would not account for changes in source balance over time.

As mentioned previously, the equations presented give solutions for a single frequency. All frequencies are solved and the resulting frequency response is converted to a filter for implementation as previously discussed.

Many probe compensation situations have thus been described. The single-ended measurement with a single-ended probe, the differential measurement with a differential probe and the single-ended measurement with the differential probe. Many other variations can utilize these same techniques described, but it is important to specifically point out two others.

The first is shown in FIG. 13. FIG. 13 is a variation on FIG. 11 in that a six-port model [56] replaces the two tees [52] and [53]. The intent here is that the exact six port measurement of the probe connection to the circuit can be measured or calculated in order to supplant the tee usage, were this found to be inadequate. It is advantageous to use a model such as [56] when s parameter measurements can be made of the probe in the exact environment in which it used in a circuit. As such, this method treats the probe and probe connection in the measurement as opposed to previously described methods which treat the probe tips as the interface.

The second is shown in FIG. 14. This is a case of utilizing two single ended probes [57] and [59] applied to two scope inputs [58] and [60]. This flow diagram is solved in a manner as already demonstrated to obtain values for the voltages in the system as in Equation 52. It is obvious from the previous examples how to do this. Examining how Equation 52 comes about reveals that the equation can always be reduced to the form of:

$$V = A \cdot \begin{bmatrix} bsp \\ bsm \end{bmatrix} \quad \text{Equation 66}$$

This is done by simply removing the columns of $vd \cdot \sqrt{Z_0} \cdot S^{-1}$ corresponding to the columns in bs that are zero. A is therefore a matrix with two columns and a number of rows corresponding to the rows in V. In this manner, a single voltage in the system can be written as:

$$v = \begin{bmatrix} a_p & a_m \end{bmatrix} \cdot \begin{bmatrix} bsp \\ bsm \end{bmatrix} \quad \text{Equation 67}$$

The voltages at the two scope inputs can also be written as:

$$\begin{bmatrix} Vscp \\ Vscm \end{bmatrix} = \begin{bmatrix} b_{pp} & b_{pm} \\ b_{mp} & b_{mm} \end{bmatrix} \cdot \begin{bmatrix} bsp \\ bsm \end{bmatrix} \quad \text{Equation 68}$$

Therefore, the transfer function of the filter would be determined by the following equations:

$$H \cdot \begin{bmatrix} Vscp \\ Vscm \end{bmatrix} = v \quad \text{Equation 69}$$

Or:

$$H \cdot \begin{bmatrix} b_{pp} & b_{pm} \\ b_{mp} & b_{mm} \end{bmatrix} \cdot \begin{bmatrix} bsp \\ bsm \end{bmatrix} = \begin{bmatrix} a_p & a_m \end{bmatrix} \cdot \begin{bmatrix} bsp \\ bsm \end{bmatrix} \quad \text{Equation 70}$$

And therefore:

$$H = \begin{bmatrix} a_p & a_m \end{bmatrix} \cdot \begin{bmatrix} b_{pp} & b_{pm} \\ b_{mp} & b_{mm} \end{bmatrix}^{-1} = \begin{bmatrix} H_p & H_m \end{bmatrix} \quad \text{Equation 71}$$

Equation 69 and Equation 71 imply correctly that in this situation, the desired waveform is a function of the waveform acquired on each of the scope inputs. Specifically, the desired waveform is the sum of two filtered waveforms acquired by the two scope channels. In this situation, unlike the single differential probe situations, no assumptions are required that relate bsp and bsm. As such, the configuration in FIG. 14 is suitable for determination of positive, negative, differential, common-mode etc. voltage components without assumptions made regarding the balance of the source.

Many probing configurations and compensation methods have been provided. All of these methods assume the knowledge of the s parameters that define the system. It is clear that the accuracy of these compensation methods depend on the accuracy of the s parameters provided, but it should also be clear that the probe compensation is beneficial even when less than perfect statements can be made regarding the system s parameters. For example, if the circuit designer knows that he has a transmission line with certain characteristic impedance, certain loss characteristics, and certain lengths, he can still make use of this algorithm by providing s parameters of the circuit element models. Similarly, assumptions of matched loads, matched sources etc. will still often lead to probe compensations that result in improved accuracy over previously used methods.

Furthermore, the methods set forth here provide for analysis of errors that might be introduced with respect to errors in the models. For example, users can often provide error bounds on circuit element measurements either as peak errors or standard deviations. Similarly, scope and probe manufacturers know similar error bounds on the probe and scope parameter measurements. Using the methods set forth, these error bounds can be utilized in, for example, a Monte-Carlo analysis, to produce compensated waveforms that allow analysis of the effects of errors on the time domain waveforms produced.

As many possible circuit topologies have been calculated, the method of calculating the probe compensation filters for arbitrary configurations and topologies should now be understood. A MathCad spreadsheet consisting of a four page calculation is shown in FIG. 15 through FIG. 18 is provided to show how to handle arbitrary configurations and topologies. Once a topology is known, the equations are filled in and solved using the helper functions provided to generate the filter transfer characteristics.

Up until this point, many various circuit topologies have been shown. Now, a method of handling completely arbitrary circuit topologies is provided.

Consider that, based on the topologies exemplified, a generic system definition consists of a text file definition that defines a picture of a system. The system definition preferably provides all of the information that defines:

The devices in a system, where a device is defined by a name, a number of ports, and the device characteristics (i.e. a set of s parameters).

The nodes in a system, where a node is defined as a connection between ports of devices.

The stimulus in a system, where a stimulus is defined as a name and a device port from which the stimulus emanates.

The measurement nodes, defined as signals that will be acquired.

The output nodes, defined as signals that will be produced.

A stimulus definition that will match the degrees of freedom in the system defined by the number of stimuli to the degrees of freedom defined by the number of measurement nodes.

From this generic system definition, the goal is to generate filters that, when applied to waveforms actually acquired at the measurement nodes into waveforms that appear at the output nodes.

It is assumed here that a picture of system (that contains all of the information above) is equivalent to a text file system description that contains the same information. The linkage between the text file system description and the picture is traditionally thought of as being one of net list generation. In other words, computer aided design (CAD) tools that generate pictorial circuit and system definitions convert to an equivalent text file definition through generation of a net list. The generation of a net list from the picture is a trivial matter. This embodiment will consider the conversion of a system description in text file form.

Given a system description file, the preferred steps in parsing this file are:

Count the device declarations and node declarations.

Dimension an array of devices descriptions (Devices) to the number of devices counted. A device description consists of a name and a set of s parameters (the name and s parameters for device d is accessed as Devices[d].Name, Devices[d].S), and is an array of ports (port p of device d is accessed as Devices[d][p]). A port consists of both an A and B node connection along with a stimulus connection (these are accessed for port p of device d as Devices[d][p].A, Devices[d][p].B, and Devices[d][p].Stim).

For each device declaration, dimension device d to the number of ports P declared for the device (i.e. Devices[d] becomes a P element array of ports).

For each device declaration, assign the s parameters to the device (i.e. assign Devices[d].S). The s parameters come from a file (i.e. Touchstone format) or from some other specification. The s parameters are interpolated to match the desired frequency resolution.

For each node declaration, take the node name (or create a unique node name) and add a "1" and a "2" creating two node names. Since the node declaration declares the node (named NodeName) connection from a device (named FromName) port (numbered FromPort) to another device (named ToName) port (numbered ToPort), the assignment is:

a. Devices[index(FromName,Devices)][FromPort−1].A=NodeName+"1"

b. Devices[index(FromName,Devices)][FromPort−1].B=NodeName+"2"

c. Devices[index(ToName,Devices)][ToPort].A=NodeName+"2"

d. Devices[index(ToName,Devices)][ToPort].B=NodeName+"1"

Where index(name,array) is a function that determines the index d such that array[d].Name==name.

For each stimulus declaration, that provides a name (Name), a device name (DeviceName) and a port number (PortNum), assign Devices[index(DeviceName,Devices)][Portnum−1].Stim=Name . Also, place the stimulus name in a vector of names M'.

Place each name declared as a measurement node in a vector of names VM.

Place each name declared as an output node in a vector of names VO.

Convert the stimulus definition declaration by creating a vector of names D of the free stimuli and a matrix R that defines the relationship of D to M' (i.e. R D=M').

At this point, the information contained in Devices contains a complete definition of the system, its connections, and its behavior. VM, VO contain the names of input and output nodes. D, R and M' contain the relationships of stimuli in the system.

The next step is to create vectors containing the stimuli names and voltage node names. This is done by first determining the total number of ports (ports) as the sum of all of the device ports in the system.

$$\left(\text{i.e. ports} = \sum_{d=0}^{Devices \cdot Elements-1} Devices[d] \cdot Elements\right).$$

By visiting each device, and each port in each device in order, the voltage node names vector N and the stimuli name vector M is filled in:

$$i \leftarrow 0 \qquad \text{Equation 72}$$
$$\text{for } d \in 0 \ldots Devices \cdot Elements - 1$$
$$\begin{cases} \text{for } p \in 0 \ldots Devices[d] \cdot Elements - 1 \\ \begin{cases} N[i] \leftarrow Devices[d][p] \cdot B \\ M[i] \leftarrow Devices[d][p] \cdot Stim \\ i \leftarrow i + 1 \end{cases} \end{cases}$$

Note that the number of elements in N and M is Ports. If there is no stimulus for a device port, the element in M is empty. M now contains a Ports element vector whose elements are either empty, or contain the name of a stimulus applied to the system. N now contains a Ports element vector whose elements contain all of the nodes defined in the system. Each element of N must be defined and have a unique name.

The next step in converting such a system description into filters is to, for each frequency of interest, generate a matrix $S_{inv}$. This is performed as follows, for each frequency of interest n, n∈[0,N] (i.e. N is the last frequency point of interest)

$$\text{for } n \in 0 \ldots N \quad \text{Equation 73}$$

$$\begin{cases} \text{for } d \in 0 \ldots \text{Devices} \cdot \text{Elements} - 1 \\ \quad \begin{cases} \text{for } p \in 0 \ldots \text{Devices}[d] \cdot \text{Elements} - 1 \\ \quad \begin{cases} r \leftarrow \text{index}(\text{Devices}[d][p] \cdot B, N) \\ S[r][r] \leftarrow 1.0 \\ \text{for } c \in 0 \ldots \text{Devices}[d] \cdot \text{Elements} - 1 \\ \quad \{S[r][\text{index}(\text{Devices}[d][c] \cdot A, N] \leftarrow -\text{Devices}[d] \cdot S[n][p][c]\} \end{cases} \end{cases} \\ S_{inv}[n] \leftarrow S^{-1} \end{cases}$$

Note that in Equation 73, since S accesses the s parameters for a device, S[n][p][c] accesses the element at row p, column c of the s parameter matrix corresponding to frequency element n.

At this point, $S_{inv}$ is an N+1 element vector of matrices where at each frequency point n, the following equation is obeyed:

$$S_{inv}[n] \cdot M = N \quad \text{Equation 74}$$

By removing the rows of M that are empty, and reordering M, one arrives at M'. Similarly, when the columns of $S_{inv}[n]$ corresponding to the empty rows of M are removed and the columns are reordered in the same manner as the rows of M were to arrive at M', $S'_{inv}[n]$ is produced such that:

$$S'_{inv}[n] \cdot M' = N \quad \text{Equation 75}$$

Thus if Stims is the number of stimuli, the number of elements in M', and recalling that Ports is the total number of device ports in the system, then $S'_{inv}[n]$ is a Ports x Stims matrix. N is a Ports element vector.

A vector V is formed containing all of the names of the voltage nodes declared previously. The number of nodes (Nodes), the number elements in V, is half of Ports. All of the names in V are found in N with either a "1" or "2" appended to the name. It is well known in dealing with s parameters that the incident power wave on an interface is defined in terms of the voltage (v), current (i), and real reference impedance (Z0) as:

$$a = \frac{v + i \cdot Z0}{2\sqrt{Z0}} \quad \text{Equation 76}$$

Similarly, the reflected power wave from an interface is defined as:

$$b = \frac{v - i \cdot Z0}{2\sqrt{Z0}} \quad \text{Equation 77}$$

Therefore, the voltage is defined by the power waves as:

$$v = \frac{a + b}{\sqrt{Z0}} \quad \text{Equation 78}$$

Since N contains the power waves, a voltage extraction matrix that converts N into voltage vector V is created such that:

$$VE \cdot N = V \quad \text{Equation 79}$$

VE is a Nodes×Ports element matrix and is created simply by putting a 1 in each row and column where V[row] with either a "1" or "2" appended is found in N[column]. The resulting VE is divided by $\sqrt{2}$ (although this falls out eventually, anyway). Substituting Equation 79 into Equation 75:

$$VE \cdot S'_{inv}[n] \cdot M' = V \quad \text{Equation 80}$$

Remember, we already have the following relationship:

$$R \cdot D = M' \quad \text{Equation 81}$$

D has a number elements which represent the degrees of freedom in the system (Degrees) and R is a Stims×Degrees element matrix.

Substituting Equation 81 into Equation 80:

$$VE \cdot S'_{inv}[n] \cdot R \cdot D = V \quad \text{Equation 82}$$

Define a new matrix:

$$VS[n] = VE \cdot S'_{inv}[n] \cdot R \quad \text{Equation 83}$$

VS is a Nodes x Degrees element matrix. Substituting Equation 83 into Equation 82:

$$VS[n] \cdot D = V \quad \text{Equation 84}$$

We have already defined two vectors VM and VO that contain the names of the measurement and output nodes, respectively. VM has a length equal to the number of measurement nodes (Meas) and VO has a length equal to the number of output nodes (Outputs). Note that both of these vectors contain names found in V, allowing two matrices VSM and VSO to be defined such that:

$$VSM[n] \cdot D = VM \quad \text{Equation 85}$$

$$VSO[n] \cdot D = VO \quad \text{Equation 86}$$

VSM is created by placing each row of VS corresponding to an element of V found in VM at the row number corresponding to the element in VM. In other words for each row rvm in VM, we find the corresponding row rv, such that V[rv]=VM[rvm] and we fill in the row rvm of VSM with the row ry of VS. VSO is created in a similar manner using VO.

VSM is a Meas×Degrees element matrix.

VSO is a Outputs×Degrees element matrix.

If Meas=Degrees, we have a properly constrained system and we can solve Equation 85:

$$D = VSM[n]^{-1} \cdot VM \quad \text{Equation 87}$$

Otherwise, if Meas>Degrees, we have an over constrained system, and we can solve Equation 85, in a least mean squared error sense, as follows:

$$D = (VSM[n]^T \cdot VSM[n])^{-1} \cdot VSM[n]^T \cdot VM \quad \text{Equation 88}$$

In the properly constrained case, we substitute Equation 87 into Equation 86:

$$VSO[n] \cdot VSM[n]^{-1} \cdot VM = VO$$

Therefore, a frequency response of a filter can be defined that converts the measured node voltage VM into the desired output voltage VO is defined:

$$H[n] = VSO[n] \cdot VSM[n]^{-1} \quad \text{Equation 89}$$

In the over constrained case, the frequency response becomes:

$$H[n] = VSO[n] \cdot (VSM[n]^T \cdot VSM[n])^{-1} \cdot VSM[n]^T \quad \text{Equation 90}$$

Thus, regardless of whether the system is properly or over constrained, either Equation 89 or Equation 90 defines the frequency response of a system such that:

$$H[n] \cdot VM = VO \quad \text{Equation 91}$$

This calculation is repeated for each frequency point n until a complete filter frequency response has been built up. Thus if m is an index into the names of measurement nodes such that VM[m] is the name of the measurement node m, and o is an index into the names of output nodes such that VO[o] is the name of an output node, then H[n][o][m] is a complex value representing the response of a filter to be applied to measurement node m to produce output node o at frequency point n. The actual filter output to produce output node at frequency point n is:

$$VO[o] = \sum_{m=0}^{Meas-1} H[n][o][m] \cdot VM[m] \qquad \text{Equation 92}$$

This response generated from Equation 89 or Equation 90 is either utilized using frequency domain filtering methods, or is converted to time domain impulse responses using the inverse FFT or other well known methods of finite impulse response (FIR) or infinite impulse response (IIR) filter design methods.

It should be noted that if the number of measurement nodes is unity, then the filter will have a topology that all skilled in the art of digital signal processing are familiar with—a filter that produces a single output waveform from a single input waveform. If the number of measurement nodes is greater than unity, however, the topology of the filter that produces any one output waveform from the input waveforms is one whereby a filter is applied to each of the measured waveforms and the result of each filter is summed to form the output waveform.

A few practical considerations are worth noting. First, the number of frequency points and their locations should be chosen judiciously to favor various techniques for conversion to time domain filters. In many cases, it is advantageous to interpolate the s parameters onto a gainful frequency scale.

Another consideration involves the invertibility of the matrices in Equation 89 and Equation 90. There will be problems at frequency locations where an output voltage is desired at a frequency where no frequency content arrives at a measurement node. This can be handled through bandwidth limiting, or restricting the frequency response range, in these cases. Similarly, even if the matrices are invertible, the gain of the filters can become too high resulting in unacceptable performance. The comment on limiting frequencies of operation still applies in this case, as well.

Equation 91 demonstrates that filters can be generated that convert measured voltages in a system into output voltages. It also shows that if output voltages and measured voltages can be acquired simultaneously with a variety of measured voltages, it is possible to work backwards to measure the desired filter responses. This is done by creating a number of measurement cases at least equal to the number of measurement nodes (Cases≧Meas), and for each case, measuring the voltages at the measurement nodes and the output nodes at a given frequency. In other words for a measurement case c, ce0 ... Cases−1, then VMC[n][m][c] is assigned with the voltage measured for frequency n at measurement node m for case c. Similarly, VOC[n][o][c] is assigned with the voltage measured simultaneously for frequency n at output node o for case c. Then, for Cases=Meas, the filter response can be calculated as:

$$H[n] = VOC[n] \cdot VMC[n]^{-1} \qquad \text{Equation 93}$$

In the situation where Cases>Meas, then the filter response can be calculated as:

$$H[n] = VOC[n] \cdot VMC[n]^T \cdot (VMC[n] \cdot VMC[n]^T)^{-1} \qquad \text{Equation 94}$$

It is obvious that the filter response can be calculated only if VMC[n] (or VMC[n]·VMC[n]$^T$) is invertible, meaning that the measurement cases generate orthogonal sets of equations. In a physical sense, when the matrix can't be inverted, it means one of several possibilities that are easily dealt with. It can mean that an output does not depend on one of the input voltages, meaning that the system of equations can be reduced by excluding the offending measurement node. Or it can mean that no voltage can be generated at a given frequency at one of the measurement nodes (a common situation in systems with standing waves, where nulls occur at various locations, or in systems with serial data signals where there will be nulls in the frequency content), but this means, again, that either the measurement node or the frequency point can be excluded (if a frequency point is excluded, the response is set to some arbitrary value (usually zero) that does not affect things anyway because no voltage can be generated at that frequency. In this case, the filter may be fully useful only for a particular serial data transmission rate.

Based on this description of a preferred embodiment, many benefits of these methods should be readily apparent and worth pointing out.

These methods are capable of compensating for effects of probing and measurement in a system, including the removal of probe loading effects and the compensation for non-ideal probe and measurement instrument response. These methods can be utilized to produce waveforms, based on acquired or simulated waveforms, that show waveforms present in situations where the measurement equipment is not connected to the circuit. These methods can be utilized to show waveforms at circuit locations other than the locations probed (again, under circumstances with and without the measurement equipment connected) and at physically inaccessible locations. These methods can be utilized to compensate probes in situations where differential probes are utilized in a single-ended measurement configuration (i.e. one tip is connected to ground) and in situations where multiple single-ended probes are utilized to make differential measurements. These methods can be utilized to measure waveforms at circuits and circuit locations that are completely virtual, meaning that, provided with an accurate system description, these methods can produce output waveforms in circuits and circuit locations that are not physically present during the measurement. The demonstrated and disclosed capability of this method to handle virtually arbitrary measurement and circuit considerations anticipates a wide variety of application.

What is claimed:

1. A method for generating one or more transfer functions for converting waveforms by a computer program stored on a non-transitory computer readable medium containing computer instructions store therein for causing the computer to perform a sequence of steps, the steps comprising the steps of:
    determining a system description, representative of a circuit, comprising a plurality of system components, at least one of the system components comprising a differential transmission line, each system component comprising at least one component characteristic, the system description further comprising at least one measurement node and at least one output node, each of the at least one measurement nodes representative of a waveform digitizing location in the circuit;
    determining one or more transfer functions for converting a waveform from one or more of the at least one measurement nodes to a waveform at one or more of the at least one output nodes; and
    storing the generated transfer functions in a non-transitory computer readable medium;

whereby a transfer function of the one or more transfer functions is adapted to produce a waveform that is a substantially correct representation of a waveform that would be present at the location in the circuit represented by the at least one output node in accordance with at least one or more waveforms that would be present at the one or more measurement nodes.

2. The method of claim 1, whereby selection of the one or more of the at least one measurement nodes and the at least one output node result in a determined transfer function that produces a waveform at the location in the circuit represented by the at least one output node such that the effects of the system component comprising the differential transmission line are removed.

3. The method of claim 1, whereby selection of the one or more of the at least one measurement nodes and the at least one output node result in a determined transfer function that produces a waveform at the location in the circuit represented by the at least one output node such that the effects of any desired system component are removed.

4. The method of claim 3, wherein the desired system component comprises a channel element.

5. The method of claim 1, wherein the system description includes an oscilloscope.

6. The method of claim 1, wherein the system description includes models of a voltage source input to the circuit.

7. The method of claim 6, whereby selection of the one or more of the at least one measurement nodes and the at least one output node result in a determined transfer function that produces a waveform at the location in the circuit represented by the at least one output node such that the effects of the system component comprising the voltage source input to the circuit are removed.

8. The method of claim 6, wherein the model comprising the voltage source input to the circuit comprises at least in part an S-parameter.

9. The method of claim 8, wherein the transfer function is determined in accordance with the removal of the S-parameter representative of the voltage source input to the circuit.

10. The method of claim 1, wherein the system description includes models of a load of the circuit.

11. The method of claim 10, whereby selection of the one or more of the at least one measurement nodes and the at least one output node result in a determined transfer function that produces a waveform at the location in the circuit represented by the at least one output node such that the effects of the system component comprising the load of the circuit are removed.

12. The method of claim 11, wherein the load of the circuit comprises probe loading effects.

13. The method of claim 10, wherein the model comprising the load of the circuit comprises at least in part an S-parameter.

14. The method of claim 13, wherein the transfer function is determined in accordance with the removal of the S-parameter representative of the load of the circuit.

15. A method for generating one or more transfer functions for converting waveforms by a computer program stored on a non-transitory computer readable medium containing computer instructions store therein for causing the computer to perform a sequence of steps, the steps comprising the steps of:
determining a system description, representative of a circuit, comprising a plurality of system components, at least one circuit element being not physically present in the circuit, each system component comprising at least one component characteristic, the system description further comprising at least one measurement node and at least one output node, each of the at least one measurement nodes representative of a waveform digitizing location in the circuit;
determining one or more transfer functions for converting a waveform from one or more of the at least one measurement nodes to a waveform at one or more of the at least one output nodes; and
storing the generated transfer functions in a non-transitory computer readable medium;
whereby a transfer function of the one or more transfer functions is adapted to produce a waveform that is a substantially correct representation of a waveform that would be present at the location in the circuit represented by the at least one output node in accordance with at least one or more waveforms that would be present at the one or more measurement nodes.

16. The method of claim 15, wherein the circuit element not physically present in the circuit comprises a differential transmission line.

17. The method of claim 15, wherein the circuit element not physically present in the circuit comprises a channel element.

18. The method of claim 17, wherein the channel element comprises an input channel of an oscilloscope.

19. The method of claim 17, wherein the channel element comprises an output channel of an oscilloscope.

20. A method for generating one or more transfer functions for converting waveforms by a computer program stored on a non-transitory computer readable medium containing computer instructions store therein for causing the computer to perform a sequence of steps, the steps comprising the steps of:
determining a system description, representative of a circuit, comprising a plurality of system components, and including at least one system component that is not physically present in the circuit, each system component comprising at least one component characteristic, the system description further comprising at least one measurement node and at least one output node, each of the at least one measurement nodes representative of a waveform digitizing location in the circuit;
determining one or more first transfer functions for converting a waveform from one or more of the at least one measurement nodes to a waveform at one or more of the at least one output nodes; and
storing the generated first transfer functions in a non-transitory computer readable medium;
modifying the system description to relocate at least one of the at least one output nodes,
determining one or more second transfer functions for converting a waveform from one or more of the at least one measurement nodes to a waveform at one or more of the relocated at least one output nodes; and
storing the generated second transfer functions in a non-transitory computer readable medium;
whereby a transfer function of the one or more first and second transfer functions is adapted to produce a waveform that is a substantially correct representation of a waveform that would be present at the location in the circuit, including the circuit element not physically present in the circuit, represented by the at least one output node in accordance with at least one or more waveforms that would be present at the one or more measurement nodes.

21. The method of claim 20, wherein the relocated one of the at least one output nodes is relocated to an arbitrary location in the system description.

22. A method for generating a waveform by a computer program stored on a non-transitory computer readable medium containing computer instructions store therein for causing the computer to perform a sequence of steps, the steps comprising the steps of:
  determining a system description in accordance with a circuit under test comprising a plurality of system components, each system component comprising at least one component characteristic;
  determining one or more transfer functions for converting a waveform at a measurement node at one location in the circuit under test to a waveform at an output node of the circuit under test;
  receiving a waveform;
  generating a waveform at the output node in accordance with the one or more transfer functions corresponding to the relationship between the one or more measurement nodes and the one or more output nodes; and
  storing the generated waveform to a non-transitory computer readable storage medium;
  wherein the output node is location at a portion of a corresponding circuit equivalent to the circuit but as if the probe were not attached, thereby removing any probe loading effects.

23. An apparatus for generating one or more transfer functions for converting waveforms, comprising:
  a controller, the controller adapted to:
    determine a system description, representative of a circuit, comprising a plurality of system components, at least one of the system components comprising a differential transmission line, each system component comprising at least one component characteristic, the system description further comprising at least one measurement node and at least one output node, each of the at least one measurement nodes representative of a waveform digitizing location in the circuit; and
    determine one or more transfer functions for converting a waveform from one or more of the at least one measurement nodes to a waveform at one or more of the at least one output nodes;
  whereby a transfer function of the one or more transfer functions is adapted to produce a waveform that is a substantially correct representation of a waveform that would be present at the location in the circuit represented by the at least one output node in accordance with at least one or more waveforms that would be present at the one or more measurement nodes.

24. The apparatus of claim 23, whereby selection by the controller of the one or more of the at least one measurement nodes and the at least one output node result in a determined transfer function that produces a waveform at the location in the circuit represented by the at least one output node such that the effects of the system component comprising the differential transmission line are removed.

25. The apparatus of claim 23, whereby selection by the controller of the one or more of the at least one measurement nodes and the at least one output node result in a determined transfer function that produces a waveform at the location in the circuit represented by the at least one output node such that the effects of any desired system component are removed.

26. The apparatus of claim 25, wherein the desired system component comprises a channel element.

27. The apparatus of claim 23, wherein the system description includes an oscilloscope.

28. The apparatus of claim 23, wherein the system description includes models of a voltage source input to the circuit.

29. The apparatus of claim 28, whereby selection of the one or more of the at least one measurement nodes and the at least one output node result in a determined transfer function that produces a waveform at the location in the circuit represented by the at least one output node such that the effects of the system component comprising the voltage source input to the circuit are removed.

30. The apparatus of claim 28, wherein the model comprising the voltage source input to the circuit comprises at least in part an S-parameter.

31. The apparatus of claim 30, wherein the transfer function is determined in accordance with the removal of the S-parameter representative of the voltage source input to the circuit.

32. The apparatus of claim 23, wherein the system description includes models of a load of the circuit.

33. The apparatus of claim 32, whereby selection by the controller of the one or more of the at least one measurement nodes and the at least one output node result in a determined transfer function that produces a waveform at the location in the circuit represented by the at least one output node such that the effects of the system component comprising the load of the circuit are removed.

34. The apparatus of claim 33, wherein the load of the circuit comprises probe loading effects.

35. The apparatus of claim 32, wherein the model comprising the load of the circuit comprises at least in part an S-parameter.

36. The apparatus of claim 35, wherein the transfer function is determined in accordance with the removal of the S-parameter representative of the load of the circuit.

37. An apparatus for generating one or more transfer functions for converting waveforms, comprising:
  a controller, the controller adapted to:
    determine a system description, representative of a circuit, comprising a plurality of system components, each system component comprising at least one component characteristic, the system description further comprising at least one measurement node and at least one output node, each of the at least one measurement nodes representative of a waveform digitizing location in the circuit; and
    determine one or more transfer functions for converting a waveform from one or more of the at least one measurement nodes to a waveform at one or more of the at least one output nodes; and
  whereby a transfer function of the one or more transfer functions is adapted to produce a waveform that is a substantially correct representation of a waveform that would be present at the location in the circuit represented by the at least one output node in accordance with at least one or more waveforms that would be present at the one or more measurement nodes.

38. The apparatus of claim 37, wherein the circuit element not physically present in the circuit comprises a differential transmission line.

39. The apparatus of claim 37, wherein the circuit element not physically present in the circuit comprises a channel element.

40. The apparatus of claim 39, wherein the channel element comprises an input channel of an oscilloscope.

41. The apparatus of claim 39, wherein the channel element comprises an output channel of an oscilloscope.

42. An apparatus for generating one or more transfer functions for converting waveforms, comprising:

a controller, the controller adapted to:
  determine a system description, representative of a circuit, comprising a plurality of system components, and including at least one system component that is not physically present in the circuit, each system component comprising at least one component characteristic, the system description further comprising at least one measurement node and at least one output node, each of the at least one measurement nodes representative of a waveform digitizing location in the circuit;
  determine one or more first transfer functions for converting a waveform from one or more of the at least one measurement nodes to a waveform at one or more of the at least one output nodes;
  modify the system description to relocate at least one of the at least one output nodes, and
  determine one or more second transfer functions for converting a waveform from one or more of the at least one measurement nodes to a waveform at one or more of the relocated at least one output nodes; and
  whereby a transfer function of the one or more first and second transfer functions is adapted to produce a waveform that is a substantially correct representation of a waveform that would be present at the location in the circuit, including the circuit element not physically present in the circuit, represented by the at least one output node in accordance with at least one or more waveforms that would be present at the one or more measurement nodes.

43. The apparatus of claim 42, wherein the relocated one of the at least one output nodes is relocated to an arbitrary location in the system description.

44. An apparatus for generating a waveform, comprising:
an input channel for receiving a waveform; and
a controller, the controller adapted to:
  determine a system description in accordance with a circuit under test comprising a plurality of system components, each system component comprising at least one component characteristic; and
  determine one or more transfer functions for converting a waveform at a measurement node at one location in the circuit under test to a waveform at an output node of the circuit under test;
  generate a waveform at the output node in accordance with the input waveform and one or more transfer functions corresponding to the relationship between the one or more measurement nodes and the one or more output nodes;
wherein the output node is location at a portion of a corresponding circuit equivalent to the circuit but as if the probe were not attached, thereby removing any probe loading effects.

* * * * *